(12) United States Patent
Zhang et al.

(10) Patent No.: US 10,296,617 B1
(45) Date of Patent: May 21, 2019

(54) SEARCHES OF HIGHLY STRUCTURED DATA

(71) Applicant: Palantir Technologies, Inc., Palo Alto, CA (US)

(72) Inventors: Kevin Zhang, Palo Alto, CA (US); David Philipson, Palo Alto, CA (US); Arjun Nayini, San Francisco, CA (US); Helen Yu, Bellevue, WA (US); Zennard Sun, Mountain View, CA (US); Antoine Llorca, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 461 days.

(21) Appl. No.: 14/875,536

(22) Filed: Oct. 5, 2015

(51) Int. Cl.
*G06F 7/00* (2006.01)
*G06F 17/30* (2006.01)
*G06F 3/0484* (2013.01)

(52) U.S. Cl.
CPC ...... *G06F 17/30398* (2013.01); *G06F 3/0484* (2013.01); *G06F 17/3056* (2013.01); *G06F 17/30392* (2013.01)

(58) Field of Classification Search
CPC ......... G06F 17/30424; G06F 17/30864; G06F 17/30554; G06F 17/30392; G06F 17/30398; G06F 17/30356
USPC .................. 707/769, 770, 999, 737, 999.005
See application file for complete search history.

(56) References Cited

U.S. PATENT DOCUMENTS

| | | | |
|---|---|---|---|
| 5,021,792 A | 6/1991 | Hwang | |
| 5,109,399 A | 4/1992 | Thompson | |
| 5,329,108 A | 7/1994 | Lamoure | |
| 5,555,503 A | 9/1996 | Kyrtsos et al. | |
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,845,300 A | 12/1998 | Corner | |

(Continued)

FOREIGN PATENT DOCUMENTS

| | | |
|---|---|---|
| DE | 102014103482 | 9/2014 |
| DE | 102014215621 | 2/2015 |

(Continued)

OTHER PUBLICATIONS

Official Communication for European Patent Application No. 14180321.3 dated Apr. 17, 2015.

(Continued)

*Primary Examiner* — Md I Uddin
(74) *Attorney, Agent, or Firm* — Hickman Palermo Becker Bingham LLP

(57) ABSTRACT

Techniques related to searches of highly structured data are described. A body of data may be represented by an object-centric data model. For a search of the body of data, an indication of a particular search template to use may be received. The particular search template may specify one or more hierarchical object types that are within a scope of the search. The one or more hierarchical object types may be defined in the object-centric data model. The particular search template may specify at least one search field. A user interface may be generated based on the particular search template. The user interface may include the at least one search field.

18 Claims, 15 Drawing Sheets

(56) References Cited

U.S. PATENT DOCUMENTS

| | | | |
|---|---|---|---|
| 6,057,757 A | 5/2000 | Arrowsmith et al. | |
| 6,091,956 A | 7/2000 | Hollenberg | |
| 6,141,659 A * | 10/2000 | Barker | G06F 17/30634 |
| 6,161,098 A | 12/2000 | Wallman | |
| 6,189,003 B1 | 2/2001 | Leal | |
| 6,219,053 B1 | 4/2001 | Tachibana et al. | |
| 6,279,018 B1 | 4/2001 | Kudrolli et al. | |
| 6,232,971 B1 | 5/2001 | Haynes | |
| 6,247,019 B1 | 6/2001 | Davies | |
| 6,272,489 B1 | 8/2001 | Rauch et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,456,997 B1 | 9/2002 | Shukla | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,674,434 B1 | 1/2004 | Chojnacki et al. | |
| 6,714,936 B1 | 3/2004 | Nevin, III | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,976,210 B1 | 12/2005 | Silva et al. | |
| 6,980,984 B1 | 12/2005 | Huffman et al. | |
| 6,985,950 B1 | 1/2006 | Hanson et al. | |
| 7,036,085 B2 | 4/2006 | Barros | |
| 7,043,702 B2 | 5/2006 | Chi et al. | |
| 7,055,110 B2 | 5/2006 | Kupka et al. | |
| 7,113,964 B1 | 9/2006 | Bequet et al. | |
| 7,139,800 B2 | 11/2006 | Bellotti et al. | |
| 7,158,797 B1 | 1/2007 | Jayaraman et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witowski et al. | |
| 7,188,100 B2 | 3/2007 | De Bellis et al. | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,383,053 B2 | 6/2008 | Kent et al. | |
| 7,426,654 B2 | 9/2008 | Adams et al. | |
| 7,454,466 B2 | 11/2008 | Bellotti et al. | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,523,100 B1 | 4/2009 | Bionda et al. | |
| 7,525,422 B2 | 4/2009 | Bishop et al. | |
| 7,529,727 B2 | 5/2009 | Arning et al. | |
| 7,529,734 B2 | 5/2009 | Dirisala | |
| 7,533,008 B2 | 5/2009 | Mangino et al. | |
| 7,558,677 B2 | 6/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,232 B2 | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,652,622 B2 | 1/2010 | Hansen et al. | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,747,648 B1 | 6/2010 | Kraft et al. | |
| 7,760,969 B2 | 7/2010 | Silverbrook et al. | |
| 7,770,100 B2 | 8/2010 | Chamberlain et al. | |
| 7,805,457 B1 | 9/2010 | Viola et al. | |
| 7,809,703 B2 | 10/2010 | Balabhadrapatruni et al. | |
| 7,818,291 B2 | 10/2010 | Ferguson et al. | |
| 7,818,658 B2 | 10/2010 | Chen | |
| 7,870,493 B2 | 1/2011 | Pall et al. | |
| 7,894,984 B2 | 2/2011 | Rasmussen et al. | |
| 7,899,611 B2 | 3/2011 | Downs et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,945,470 B1 | 5/2011 | Cohen et al. | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,970,240 B1 | 6/2011 | Chao et al. | |
| 7,971,150 B2 | 6/2011 | Raskutti et al. | |
| 7,984,374 B2 | 6/2011 | Caro et al. | |
| 7,971,784 B2 | 7/2011 | Lapstun | |
| 8,001,465 B2 | 8/2011 | Kudrolli et al. | |
| 8,001,482 B2 | 8/2011 | Bhattiprolu et al. | |
| 8,010,545 B2 | 8/2011 | Stefik et al. | |
| 8,015,487 B2 | 9/2011 | Roy et al. | |
| 8,024,778 B2 | 9/2011 | Cash et al. | |
| 8,028,894 B2 | 10/2011 | Lapstun et al. | |
| 8,036,632 B1 | 10/2011 | Cona et al. | |
| 8,042,110 B1 | 10/2011 | Kawahara et al. | |
| 8,103,543 B1 | 1/2012 | Zwicky | |
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,214,361 B1 | 7/2012 | Sandler et al. | |
| 8,214,764 B2 | 7/2012 | Gemmell et al. | |
| 8,225,201 B2 | 7/2012 | Michael | |
| 8,229,947 B2 | 7/2012 | Fujinaga | |
| 8,230,333 B2 | 7/2012 | Decherd et al. | |
| 8,271,461 B2 | 9/2012 | Pike et al. | |
| 8,280,880 B1 | 10/2012 | Aymeloglu et al. | |
| 8,285,725 B2 | 10/2012 | Bayliss | |
| 8,290,926 B2 | 10/2012 | Ozzie et al. | |
| 8,290,942 B2 | 10/2012 | Jones et al. | |
| 8,301,464 B1 | 10/2012 | Cave et al. | |
| 8,301,904 B1 | 10/2012 | Gryaznov | |
| 8,312,367 B2 | 11/2012 | Foster | |
| 8,312,546 B2 | 11/2012 | Alme | |
| 8,352,881 B2 | 1/2013 | Champion et al. | |
| 8,368,695 B2 | 2/2013 | Howell et al. | |
| 8,397,171 B2 | 3/2013 | Klassen et al. | |
| 8,402,047 B1 | 3/2013 | Mangini et al. | |
| 8,412,707 B1 | 4/2013 | Mianji | |
| 8,447,722 B1 | 5/2013 | Ahuja et al. | |
| 8,452,790 B1 | 5/2013 | Mianji | |
| 8,463,036 B1 | 6/2013 | Ramesh et al. | |
| 8,477,994 B1 | 7/2013 | Noshadi | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,510,743 B2 | 8/2013 | Hackborn et al. | |
| 8,514,082 B2 | 8/2013 | Cova et al. | |
| 8,515,207 B2 | 8/2013 | Chau | |
| 8,521,135 B2 | 8/2013 | Cryderman | |
| 8,554,579 B2 | 10/2013 | Tribble et al. | |
| 8,554,653 B2 | 10/2013 | Falkenborg et al. | |
| 8,554,709 B2 | 10/2013 | Goodson et al. | |
| 8,577,911 B1 | 11/2013 | Stepinski et al. | |
| 8,589,273 B2 | 11/2013 | Creeden et al. | |
| 8,595,234 B2 | 11/2013 | Siripuapu et al. | |
| 8,620,641 B2 | 12/2013 | Farnsworth et al. | |
| 8,639,757 B1 | 1/2014 | Zang et al. | |
| 8,646,080 B2 | 2/2014 | Williamson et al. | |
| 8,676,857 B1 | 3/2014 | Adams et al. | |
| 8,688,069 B1 | 4/2014 | Cazanas et al. | |
| 8,689,108 B1 | 4/2014 | Duffield et al. | |
| 8,713,467 B1 | 4/2014 | Goldenberg et al. | |

(56) References Cited

U.S. PATENT DOCUMENTS

| | | |
|---|---|---|
| 8,726,379 B1 | 5/2014 | Stiansen et al. |
| 8,739,059 B2 | 5/2014 | Rabenold et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,762,870 B2 | 6/2014 | Robotham et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,849,254 B2 | 9/2014 | Bolon |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,037,407 B2 | 5/2015 | Thompson |
| 9,043,696 B1 | 5/2015 | Meiklejohn et al. |
| 9,043,894 B1 | 5/2015 | Dennison et al. |
| 9,116,975 B2 | 8/2015 | Shankar et al. |
| 9,123,086 B1 | 9/2015 | Freeland et al. |
| 9,262,529 B2 | 2/2016 | Colgrove et al. |
| 9,275,069 B1 | 3/2016 | Garrod et al. |
| 9,301,103 B1 | 3/2016 | Thompson |
| 9,313,233 B2 | 4/2016 | Sprague et al. |
| 9,380,431 B1 | 6/2016 | Freeland et al. |
| 9,674,662 B2 | 6/2017 | Freeland et al. |
| 9,727,376 B1 | 8/2017 | Bills et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0061211 A1 | 3/2003 | Shultz et al. |
| 2003/0140106 A1 | 7/2003 | Raguseo |
| 2003/0144868 A1 | 7/2003 | MacLntyre et al. |
| 2003/0152277 A1 | 8/2003 | Hall et al. |
| 2003/0163352 A1 | 8/2003 | Surpin et al. |
| 2003/0225755 A1 | 12/2003 | Lwayama et al. |
| 2003/0227746 A1 | 12/2003 | Sato |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | McPherson et al. |
| 2004/0193600 A1 | 9/2004 | Kaasten et al. |
| 2004/0203380 A1 | 10/2004 | Hamdi et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125436 A1 | 6/2005 | Mudunuri et al. |
| 2005/0125715 A1 | 6/2005 | Franco et al. |
| 2005/0143096 A1 | 6/2005 | Boesch |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0053096 A1 | 3/2006 | Subramanian |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0116991 A1 | 6/2006 | Calderwood |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0149596 A1 | 7/2006 | Surpin et al. |
| 2006/0161558 A1 | 7/2006 | Tamma et al. |
| 2006/0161568 A1 | 7/2006 | Dettinger et al. |
| 2006/0203337 A1 | 9/2006 | White |
| 2006/0206235 A1 | 9/2006 | Shakes et al. |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0250764 A1 | 11/2006 | Howarth et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0043744 A1 | 2/2007 | Carro |
| 2007/0057966 A1 | 3/2007 | Ohno et al. |
| 2007/0072591 A1 | 3/2007 | McGary et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0118547 A1 | 5/2007 | Gupta et al. |
| 2007/0130541 A1 | 6/2007 | Louch et al. |
| 2007/0150369 A1 | 6/2007 | Zivin |
| 2007/0150520 A1 | 6/2007 | Bennett et al. |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0250491 A1 | 10/2007 | Olszak et al. |
| 2007/0266336 A1 | 11/2007 | Nojima et al. |
| 2007/0294643 A1 | 12/2007 | Kyle |
| 2008/0007618 A1 | 1/2008 | Yuasa |
| 2008/0025629 A1 | 1/2008 | Obrador et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0164998 A1 | 7/2008 | Scherpbier et al. |
| 2008/0195417 A1 | 8/2008 | Surpin et al. |
| 2008/0195608 A1 | 8/2008 | Clover |
| 2008/0208844 A1* | 8/2008 | Jenkins ............ G06F 17/30395 |
| 2008/0222295 A1 | 9/2008 | Robinson et al. |
| 2008/0227473 A1 | 9/2008 | Haney |
| 2008/0252419 A1 | 10/2008 | Batchelor et al. |
| 2008/0263468 A1 | 10/2008 | Cappione et al. |
| 2008/0267107 A1 | 10/2008 | Rosenberg |

(56) References Cited

U.S. PATENT DOCUMENTS

| | | |
|---|---|---|
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301559 A1 | 12/2008 | Martinsen et al. |
| 2008/0301643 A1 | 12/2008 | Appleton et al. |
| 2008/0313281 A1 | 12/2008 | Scheidl et al. |
| 2009/0002492 A1 | 1/2009 | Velipasalar et al. |
| 2009/0005070 A1 | 1/2009 | Forstall et al. |
| 2009/0006471 A1 | 1/2009 | Richardson et al. |
| 2009/0006474 A1 | 1/2009 | Richardson et al. |
| 2009/0027418 A1 | 1/2009 | Maru et al. |
| 2009/0030915 A1 | 1/2009 | Winter et al. |
| 2009/0037912 A1 | 2/2009 | Stoitsev et al. |
| 2009/0055251 A1 | 2/2009 | Shah et al. |
| 2009/0088964 A1 | 4/2009 | Schaaf et al. |
| 2009/0119309 A1 | 5/2009 | Gibson et al. |
| 2009/0119578 A1 | 5/2009 | Relyea et al. |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0138790 A1 | 5/2009 | Larcheveque et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0156231 A1 | 6/2009 | Versteeg et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0265105 A1 | 10/2009 | Davis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0315679 A1 | 12/2009 | Bauchot et al. |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0058212 A1 | 3/2010 | Belitz et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0082842 A1 | 4/2010 | Lavrov et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0121817 A1 | 5/2010 | Meyer et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0173619 A1 | 7/2010 | Hua et al. |
| 2010/0185984 A1 | 7/2010 | Wright et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0214117 A1 | 8/2010 | Hazzani |
| 2010/0223543 A1 | 9/2010 | Marston |
| 2010/0228812 A1 | 9/2010 | Uomini |
| 2010/0250412 A1 | 9/2010 | Wagner |
| 2010/0280857 A1 | 11/2010 | Liu et al. |
| 2010/0281458 A1 | 11/2010 | Paladino et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0022312 A1 | 1/2011 | McDonough et al. |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0093440 A1 | 4/2011 | Asakura et al. |
| 2011/0111786 A1 | 5/2011 | Rao |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0158469 A1 | 6/2011 | Mastykarz |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0202557 A1 | 8/2011 | Atsmon et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0276423 A1 | 11/2011 | Davidson |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0010812 A1 | 1/2012 | Thompson |
| 2012/0014560 A1 | 1/2012 | Obrador et al. |
| 2012/0015673 A1 | 1/2012 | Klassen et al. |
| 2012/0019559 A1 | 1/2012 | Siler et al. |
| 2012/0032975 A1 | 2/2012 | Koch |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0150578 A1 | 6/2012 | Mangat et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0166929 A1 | 6/2012 | Henderson et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0208636 A1 | 8/2012 | Feige |
| 2012/0216106 A1 | 8/2012 | Casey |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |

(56) References Cited

U.S. PATENT DOCUMENTS

| | | |
|---|---|---|
| 2012/0246148 A1 | 9/2012 | Dror |
| 2012/0254129 A1 | 10/2012 | Wheeler et al. |
| 2012/0268269 A1 | 10/2012 | Doyle |
| 2012/0277914 A1 | 11/2012 | Crow et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0317202 A1 | 12/2012 | Lewis |
| 2012/0323888 A1 | 12/2012 | Osann, Jr. |
| 2012/0330973 A1 | 12/2012 | Ghuneim et al. |
| 2013/0005362 A1 | 1/2013 | Borghei |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0013642 A1 | 1/2013 | Klein et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0101159 A1 | 4/2013 | Chao et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0143597 A1 | 6/2013 | Mitsuya et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0165069 A1 | 6/2013 | Nitta et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0196614 A1 | 8/2013 | Pahlevani |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0235749 A1 | 9/2013 | Cho et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262171 A1 | 10/2013 | Solodko et al. |
| 2013/0262497 A1 | 10/2013 | Case et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0295970 A1 | 11/2013 | Sheshadri et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0079340 A1 | 3/2014 | Kawano |
| 2014/0081685 A1 | 3/2014 | Thacker et al. |
| 2014/0093174 A1 | 4/2014 | Zhang et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0258827 A1 | 9/2014 | Gormish et al. |
| 2014/0267294 A1 | 9/2014 | Ma |
| 2014/0267295 A1 | 9/2014 | Sharma |
| 2014/0279824 A1 | 9/2014 | Tamayo |
| 2014/0302783 A1 | 10/2014 | Aiuto et al. |
| 2014/0304582 A1 | 10/2014 | Bills et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0357299 A1 | 12/2014 | Xu et al. |
| 2014/0358252 A1 | 12/2014 | Ellsworth et al. |
| 2015/0005014 A1 | 1/2015 | Huang et al. |
| 2015/0019394 A1 | 1/2015 | Unser et al. |
| 2015/0046870 A1 | 2/2015 | Goldenberg et al. |
| 2015/0080012 A1 | 3/2015 | Sprague et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134633 A1 | 5/2015 | Colgrove et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0227295 A1 | 8/2015 | Meiklejohn et al. |
| 2015/0331919 A1 | 11/2015 | Freeland et al. |
| 2016/0110458 A1 | 4/2016 | Colgrove et al. |
| 2017/0132200 A1* | 5/2017 | Noland ............... G06F 17/248 |

FOREIGN PATENT DOCUMENTS

| | | |
|---|---|---|
| EP | 1 672 527 | 6/2006 |
| EP | 2 400 448 A1 | 12/2011 |
| EP | 2400448 | 12/2011 |
| EP | 2551799 | 1/2013 |
| EP | 2560134 | 2/2013 |
| EP | 2778977 | 9/2014 |
| EP | 2816513 | 12/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2916276 | 9/2015 |

(56) References Cited

FOREIGN PATENT DOCUMENTS

| | | |
|---|---|---|
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2002/065353 | 8/2002 |
| WO | WO 2004/038548 | 5/2004 |
| WO | WO 2004/038548 A2 | 5/2004 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

Official Communication for Australian Patent Application No. 2014201511 dated Feb. 27, 2015.
Official Commuincation for Australian Patent Application No. 2014202442 dated Mar. 19, 2015.
Official Communication for Great Britain Patent Application No. 1404457.2 dated Aug. 14, 2014.
Hansen et al., "Analyzing Social Media Networks with NodeXL: Insights from a Connected World", Chapter 4, pp. 53-67 and Chapter 10, pp. 143-164, published Sep. 2010.
Official Communication for New Zealand Patent Application No. 628263 dated Aug. 12, 2014.
Gesher, Ari, "Palantir Screenshots in the Wild: Swing Sightings," The Palantir Blog, Sep. 11, 2007, pp. 1- 12.
Official Communication for European Patent Application No. 15155846.7 dated Jul. 8, 2015.
European Patent Office, "Search Report" in Application No. 214 159 447.3-1958, dated Sep. 28, 2016, 6 pages.
Claims in European Application No. 14 159 447.3-1958 dated Sep. 2016, 2 pages.
Palmas et al., "An Edge-Bunding Layout for Interactive Parallel Coordinates" 2014 IEEE Pacific Visualization Symposium, pp. 57-64.
Manske, "File Saving Dialogs," <http://www.mozilla.org/editor/ui_specs/FileSaveDialogs.html>, Jan. 20, 1999, pp. 7.
Huang et al., "Systematic and Integrative Analysis of Large Gene Lists Using David Bioinformatics Resources," Nature Protocols, 4.1, 2008, 44-57.
Definition "Identify", downloaded Jan. 22, 2015, 1 page.
Official Communication for European Patent Application No. 14180142.3 dated Feb. 6, 2015.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Official Communication for Netherlands Patent Application No. 2013306 dated Apr. 24, 2015.
Official Communication for European Patent Application No. 14197879.1 dated Apr. 28, 2015.
"A Quick Guide to UniProtKB Swiss-Prot & TrEMBL," Sep. 2011, pp. 2.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Official Communication for European Patent Application No. 14187996.5 dated Feb. 12, 2015.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Official Communication for European Patent Application No. 14158861.6 dated Jun. 16, 2014.
Yang et al., "HTML Page Analysis Based on Visual Cues", A129, pp. 859-864, 2001.
Li et al., "Interactive Multimodal Visual Search on Mobile Device," IEEE Transactions on Multimedia, vol. 15, No. 3, Apr. 1, 2013, pp. 594-607.
Official Communication for Australian Patent Application No. 2014210614 dated Jun. 5, 2015.
Official Communication for European Patent Application No. 14159464.8 dated Oct. 8, 2014.
Kitts, Paul, "Chapter 14: Genome Assembly and Annotation Process," The NCBI Handbook, Oct. 2002, pp. 1-21.
Official Communication for European Patent Application No. 14159464.8 dated Jul. 31, 2014.
Official Communication for Australian Patent Application No. 2014210604 dated Jun. 5, 2015.
Rouse, Margaret, "OLAP Cube," <http://searchdatamanagement.techtarget.com/definition/OLAP-cube>, Apr. 28, 2012, pp. 16.
Goswami, Gautam, "Quite Writly Said!," One Brick at a Time, Aug. 21, 2005, pp. 7.
Conner, Nancy, "Google Apps: The Missing Manual," May 1, 2008, pp. 15.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Official Communication for New Zealand Patent Application No. 628840 dated Aug. 28, 2014.
Map of San Jose, CA. Retrieved Oct. 2, 2013 from http://maps.bing.com.
Official Communication for Great Britain Patent Application No. 1413935.6 dated Jan. 27, 2015.
Official Communication for European Patent Application No. 14159464.8 dated Sep. 22, 2014.
Official Communication for Australian Patent Application No. 2014250678 dated Jun. 17, 2015.
Griffith, Daniel A., "A Generalized Huff Model," Geographical Analysis, Apr. 1982, vol. 14, No. 2, pp. 135-144.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Official Communication for Australian Patent Application No. 2014213553 dated May 7, 2015.
Official Communication for New Zealand Patent Application No. 622513 dated Aug. 3, 2014.
Nierman, "Evaluating Structural Similarity in XML Documents", 6 pages, 2002.
Official Communication for European Patent Application No. 14191540.5 dated May 27, 2015.
Official Communication for European Patent Application No. 14186225.0 dated Feb. 13, 2015.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Official Communication for New Zealand Patent Application No. 627962 dated Aug. 5, 2014.
"A Word About Banks and the Laundering of Drug Money," Aug. 18, 2012, http://www.golemxiv.co.uk/2012/08/a-word-about-banks-and-the-laundering-of-drug-money/.

(56) References Cited

OTHER PUBLICATIONS

Official Communication for Great Britain Patent Application No. 1404574.4 dated Dec. 18, 2014.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
Official Communciation for Great Britain Patent Application No. 1411984.6 dated Dec. 22, 2014.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Microsoft Office—Visio, "About connecting shapes," <http://office.microsoft.com/en-us/visio-help/about-connecting-shapes-HP085050369.aspx> printed Aug. 4, 2011 in 6 pages.
Official Communication for European Patent Application No. 14189802.3 dated May 11, 2015.
Official Communication for European Patent Application No. 14189344.6 dated Feb. 20, 2015.
Definition "Overlay", downloaded Jan. 22, 2015, 1 page.
Map of San Jose, CA. Retrieved Oct. 2, 2013 from http://maps.yahoo.com.
Manno et al., "Introducing Collaboration in Single-user Applications through the Centralized Control Architecture," 2010, pp. 10.
Boyce, Jim, "Microsoft Outlook 2010 Inside Out," Aug. 1, 2010, retrieved from the internet https://capdtron.files.wordpress.com/2013/01/outlook-2010-inside_out.pdf.
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for European Patent Application No. 14197895.7 dated Apr. 28, 2015.
Official Communication for European Patent Application No. 14199182.8 dated Mar. 13, 2015.
Huff et al., "Calibrating the Huff Model Using ArcGIS Business Analyst," ESRI, Sep. 2008, pp. 33.
Official Communication for New Zealand Patent Application No. 624557 dated May 14, 2014.
Acklen, Laura, "Absolute Beginner's Guide to Microsoft Word 2003," Dec. 24, 2003, pp. 15-18, 34-41, 308-316.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Official Communication for New Zealand Patent Application No. 622517 dated Apr. 3, 2014.
Keylines.com, "Visualizing Threats: Improved Cyber Security Through Network Visualization," Apr. 2014, <http://keylines.com/wp-content/uploads/2014/04/Visualizing-Threats1pdf> downloaded May 12, 2014 in 10 pages.
Official Communication for European Patent Application No. 14189347.9 dated Mar. 4, 2015.
Keylines.com, "KeyLines Datasheet," Mar. 2014, <http://keylines.com/wp-content/uploads/2014/03/KeyLines-datasheet.pdf> downloaded May 12, 2014 in 2.
Official Communication for New Zealand Patent Application No. 628495 dated Aug. 19, 2014.
Umagandhi et al., "Search Query Recommendations Using Hybrid User Profile with Query Logs," International Journal of Computer Applications, vol. 80, No. 10, Oct. 1, 2013, pp. 7-18.
Official Communication for New Zealand Patent Application No. 628161 dated Aug. 25, 2014.
Huff, David L., "Parameter Estimation in the Huff Model," ESRI, ArcUser, Oct.-Dec. 2003, pp. 34-36.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Canese et al., "Chapter 2: PubMed: The Bibliographic Database," The NCBI Handbook, Oct. 2002, pp. 1-10.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Thompson, Mick, "Getting Started with GEO," Getting Started with GEO, Jul. 26, 2011.
Delcher et al., "Identifying Bacterial Genes and Endosymbiont DNA with Glimmer," BioInformatics, vol. 23, No. 6, 2007, pp. 673-679.
Hardesty, "Privacy Challenges: Analysis: It's Surprisingly Easy to Identify Individuals from Credit-Card Metadata," MIT News on Campus and Around the World, Mit News Office, Jan. 29, 2015, 3 pages.
Official Communication for New Zealand Patent Application No. 628585 dated Aug. 26, 2014.
Bluttman et al., "Excel Formulas and Functions for Dummies," 2005, Wiley Publishing, Inc., pp. 280, 284-286.
Official Communication for European Patent Application No. 14180432.8 dated Jun. 23, 2015.
Official Communication for European Patent Application No. 14180281.9 dated Jan. 26, 2015.
Hibbert et al., "Prediction of Shopping Behavior Using a Huff Model Within a GIS Framework," Healthy Eating in Context, Mar. 18, 2011, pp. 16.
Sirotkin et al., "Chapter 13: The Processing of Biological Sequence Data at NCBI," The NCBI Handbook, Oct. 2002, pp. 1-11.
Madden, Tom, "Chapter 16: The BLAST Sequence Analysis Tool," The NCBI Handbook, Oct. 2002, pp. 1-15.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Map of San Jose, CA. Retrieved Oct. 2, 2013 from http://maps.google.com.
Notice of Acceptance for Australian Patent Application No. 2014250678 dated Oct. 7, 2015.
Official Communication for Great Britain Patent Application No. 1408025.3 dated Nov. 6, 2014.
"A First Look: Predicting Market Demand for Food Retail using a Huff Analysis," TRF Policy Solutions, Jul. 2012, pp. 30.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Sigrist, et al., "Prosite, a Protein Domain Database for Functional Characterization and Annotation," Nucleic Acids Research, 2010, vol. 38, pp. D161-D166.
"The FASTA Program Package," fasta-36.3.4, Mar. 25, 2011, pp. 29.
Mizrachi, Ilene, "Chapter 1: Gen Bank: The Nuckeotide Sequence Database," The NCBI Handbook, Oct. 2002, pp. 1-14.
IBM, "Determining Business Object Structure," IBM, 2004, 9 pages.
U.S. Appl. No. 13/181,392, filed Jul. 21, 2011, Notice of Allowance, dated Jan. 22, 2015.
U.S. Appl. No. 13/838,815, filed Mar. 15, 2013, Notice of Allowance, dated Jan. 29, 2015.
U.S. Appl. No. 13/838,815, filed Mar. 15, 2013, Notice of Allowance, dated Jun. 19, 2015.
U.S. Appl. No. 13/181,392, filed Jul. 21, 2011, Final Office Action, dated Aug. 28, 2014.
U.S. Appl. No. 14/088,251, filed Nov. 22, 2013, Office Action, dated Feb. 12, 2015.
U.S. Appl. No. 14/487,342, filed Sep. 16, 2014, First Action Interview, dated Apr. 23, 2015.
U.S. Appl. No. 14/196,814, filed Mar. 4, 2014, Office Action, dated May 5, 2015.

(56) References Cited

OTHER PUBLICATIONS

U.S. Appl. No. 14/027,118, filed Sep. 13, 2013, Office Action, dated May 12, 2015.
U.S. Appl. No. 14/088,251, filed Nov. 22, 2013, Final Office Action, dated May 20, 2015.
U.S. Appl. No. 13/831,199, filed Mar. 14, 2013, Office Action, dated Jun. 3, 2015.
U.S. Appl. No. 14/088,251, filed Nov. 22, 2013, Interview Summary, dated Jun. 30, 2015.
U.S. Appl. No. 14/334,232, filed Jul. 17, 2014, Office Action, dated Jul. 10, 2015.
U.S. Appl. No. 13/839,026, filed Mar. 15, 2013, Office Action, dated Aug. 4, 2015.
U.S. Appl. No. 14/088,251, filed Nov. 22, 2013, Office Action, dated Aug. 26, 2015.
U.S. Appl. No. 14/027,118, filed Sep. 13, 2013, Office Action, dated Sep. 16, 2015.
U.S. Appl. No. 13/839,026, filed Mar. 15, 2013, Restriction Requirement, dated Apr. 2, 2015.
U.S. Appl. No. 14/487,342, filed Sep. 16, 2014, Notice of Allowance, dated Sep. 23, 2015.
U.S. Appl. No. 14/196,814, filed Mar. 4, 2014, Office Action, dated Oct. 7, 2015.
U.S. Appl. No. 13/831,199, filed Mar. 14, 2013, Final Office Action, dated Oct. 6, 2015.
U.S. Appl. No. 14/334,232, filed Jul. 17, 2014, Notice of Allowance, dated Nov. 10, 2015.
U.S. Appl. No. 14/690,905, filed Apr. 20, 2015, Notice of Allowance, dated Nov. 23, 2015.
U.S. Appl. No. 14/690,905, filed Apr. 20, 2015, Office Action, dated Oct. 7, 2015.
U.S. Appl. No. 13/247,987, filed Sep. 28, 2011, Office Action, dated Apr. 2, 2015.
U.S. Appl. No. 13/831,791, filed Mar. 15, 2013, Office Action, dated Mar. 4, 2015.
U.S. Appl. No. 13/835,688, filed Mar. 15, 2013, First Office Action Interview, dated Jun. 17, 2015.
U.S. Appl. No. 14/102,394, filed Dec. 10, 2013, Notice of Allowance, dated Aug. 25, 2014.
U.S. Appl. No. 14/108,187, filed Dec. 16, 2013, Notice of Allowance, dated Aug. 29, 2014.
U.S. Appl. No. 14/135,289, filed Dec. 19, 2013, Notice of Allowance, dated Oct. 14, 2014.
U.S. Appl. No. 14/148,568, filed Jan. 6, 2014, Office Action, dated Oct. 22, 2014.
U.S. Appl. No. 14/148,568, filed Jan. 6, 2014, Office Action, dated Mar. 26, 2015.
U.S. Appl. No. 14/192,767, filed Feb. 27, 2014, Notice of Allowance, dated Dec. 16, 2014.
U.S. Appl. No. 14/225,006, filed Mar. 25, 2014, First Office Action Interview, dated Sep. 10, 2014.
U.S. Appl. No. 14/225,006, filed Mar. 25, 2014, First Office Action Interview, dated Feb. 27, 2015.
U.S. Appl. No. 14/225,084, filed Mar. 25, 2014, First Office Action Interview, dated Sep. 2, 2014.
U.S. Appl. No. 14/225,084, filed Mar. 25, 2014, Notice of Allowance, dated May 4, 2015.
U.S. Appl. No. 14/225,084, filed Mar. 25, 2014, First Office Action Interview, dated Feb. 20, 2015.
U.S. Appl. No. 14/225,160, filed Mar. 25, 2014, Final Office Action, dated Feb. 11, 2015.
U.S. Appl. No. 14/225,160, filed Mar. 25, 2014, Advisory Action, dated May 20, 2015.
U.S. Appl. No. 14/225,160, filed Mar. 25, 2014, First Office Action Interview, dated Oct. 22, 2014.
U.S. Appl. No. 14/268,964, filed May 2, 2014, First Office Action Interview, dated Sep. 3, 2014.
U.S. Appl. No. 14/268,964, filed May 2, 2014, Notice of Allowance, dated Dec. 3, 2014.
U.S. Appl. No. 14/289,596, filed May 28, 2014, First Office Action Interview, dated Jul. 18, 2014.
U.S. Appl. No. 14/289,596, filed May 28, 2014, Final Office Action, dated Jan. 26, 2015.
U.S. Appl. No. 14/289,599, filed May 28, 2014, First Office Action Interview, dated Jul. 22, 2014.
U.S. Appl. No. 14/289,599, filed May 28, 2014, Final Office Action, dated May 29, 2015.
U.S. Appl. No. 14/294,098, filed Jun. 2, 2014, Final Office Action, dated Nov. 6, 2014.
U.S. Appl. No. 14/294,098, filed Jun. 2, 2014, First Office Action Interview, dated Aug. 15, 2014.
U.S. Appl. No. 14/294,098, filed Jun. 2, 2014, Notice of Allowance, dated Dec. 29, 2014.
U.S. Appl. No. 14/306,138, filed Jun. 16, 2014, Final Office Action, dated Feb. 18, 2015.
U.S. Appl. No. 14/306,138, filed Jun. 16, 2014, First Office Action Interview, dated Sep. 23, 2014.
U.S. Appl. No. 14/306,138, filed Jun. 16, 2014, Office Action, dated May 26, 2015.
U.S. Appl. No. 14/306,147, filed Jun. 16, 2014, First Office Action Interview, dated Sep. 9, 2014.
U.S. Appl. No. 14/306,147, filed Jun. 16, 2014, Final Office Action, dated Feb. 19, 2015.
U.S. Appl. No. 14/306,154, filed Jun. 16, 2014, First Office Action Interview, dated Sep. 9, 2014.
U.S. Appl. No. 14/306,154, filed Jun. 16, 2014, Final Office Action, dated Mar. 11, 2015.
U.S. Appl. No. 14/306,154, filed Jun. 16, 2014, Advisory Action, dated May 15, 2015.
U.S. Appl. No. 14/319,765, filed Jun. 30, 2014, First Office Action Interview, dated Feb. 4, 2015.
U.S. Appl. No. 14/319,765, filed Jun. 30, 2014, First Office Action Interview, dated Nov. 25, 2014.
U.S. Appl. No. 14/323,935, filed Jul. 3, 2014, Office Action, dated Jun. 22, 2015.
U.S. Appl. No. 14/323,935, filed Jul. 3, 2014, First Office Action Interview, dated Nov. 28, 2014.
U.S. Appl. No. 14/323,935, filed Jul. 3, 2014, First Office Action Interview, dated Mar. 31, 2015.
U.S. Appl. No. 14/326,738, filed Jul. 9, 2014, First Office Action Interview, dated Dec. 2, 2014.
U.S. Appl. No. 14/326,738, filed Jul. 9, 2014, First Office Action Interview, dated Mar. 31, 2015.
U.S. Appl. No. 14/473,552, filed Aug. 29, 2014, Interview Summary, dated Feb. 24, 2015.
U.S. Appl. No. 14/486,991, filed Sep. 15, 2014, Office Action, dated Mar. 10, 2015.
U.S. Appl. No. 14/504,103, filed Oct. 1, 2014, First Office Action Interview, dated Feb. 5, 2015.
U.S. Appl. No. 14/504,103, filed Oct. 1, 2014, Notice of Allowance, dated May 18, 2015.
U.S. Appl. No. 14/504,103, filed Oct. 1, 2014, First Office Action Interview, dated Mar. 31, 2015.
U.S. Appl. No. 14/579,752, filed Dec. 22, 2014, First Office Action Interview, dated May 26, 2015.
U.S. Appl. No. 14/616,080, filed Feb. 6, 2015, Notice of Allowance, dated Apr. 2, 2015.
U.S. Appl. No. 14/639,606, filed Mar. 5, 2015 First Office Action Interview, dated May 18, 2015.
U.S. Appl. No. 14/639,606, filed Mar. 5, 2015, First Action Interview, dated Jul. 24, 2015.
U.S. Appl. No. 14/306,147, filed Jun. 16, 2014, Office Action, dated Aug. 7, 2015.
U.S. Appl. No. 14/319,765, filed Jun. 30, 2014, Final Office Action, dated Jun. 16, 2015.
U.S. Appl. No. 14/289,596, filed May 28, 2014, Advisory Action, dated Apr. 30, 2015.
U.S. Appl. No. 14/225,006, filed Mar. 25, 2014, Final Office Action, dated Sep. 2, 2015.
U.S. Appl. No. 13/836,815, filed Mar. 15, 2013, Office Action, dated Oct. 24, 2015.

(56) References Cited

OTHER PUBLICATIONS

U.S. Appl. No. 14/579,752, filed Dec. 22, 2014, Final Office Action, dated Aug. 19, 2015.
U.S. Appl. No. 13/839,026, filed Mar. 15, 2013, Notice of Allowance, dated Jul. 6, 2015.
U.S. Appl. No. 14/306,154, filed Jun. 16, 2014, Office Action, dated Jul. 6, 2015.
U.S. Appl. No. 14/306,138, filed Jun. 16, 2014, Final Office Action, Sep. 14, 2015.
U.S. Appl. No. 14/473,860, filed Aug. 29, 2014, Notice of Allowance, dated Jan. 5, 2015.
U.S. Appl. No. 13/831,199, filed Mar. 14, 2013, Office Action, dated May 9, 2016.
U.S. Appl. No. 14/196,814, filed Mar. 4, 2014, First Office Action Interview, dated Apr. 16, 2014.
U.S. Appl. No. 14/813,749, filed Jul. 30, 2015, Office Action, dated Sep. 28, 2015.
U.S. Appl. No. 14/225,160, filed Mar. 25, 2014, Office Action, dated Aug. 12, 2015.
U.S. Appl. No. 13/831,199, filed Mar. 14, 2013, Final Office Action, dated Nov. 4, 2016.
U.S. Appl. No. 14/490,612, filed Sep. 18, 2014, Final Office Action, dated Aug. 18, 2015.
U.S. Appl. No. 14/486,991, filed Sep. 15, 2014, Notice of Allowance, dated May 1, 2015.
U.S. Appl. No. 14/027,118, filed Feb. 4, 2016, Notice of Allowance, dated Apr. 4, 2016.
U.S. Appl. No. 15/047,405, filed Feb. 18, 2016, Office Action, dated Apr. 1, 2016.
U.S. Appl. No. 14/726,353, filed May 29, 2015, First Office Action Interview, dated Sep. 10, 2015.
U.S. Appl. No. 13/247,987, filed Sep. 28, 2011, Office Action, dated Sep. 22, 2015.
U.S. Appl. No. 12/556,318, filed Sep. 9, 2009, Office Action, dated Jul. 2, 2015.
U.S. Appl. No. 14/631,633, filed Feb. 25, 2015, First Office Action Interview, dated Sep. 10, 2015.
U.S. Appl. No. 14/326,738, filed Jul. 9, 2014, Final Office Action, dated Jul. 31, 2015.
U.S. Appl. No. 14/077,159, filed May 3, 2016, Office Action, dated Mar. 12, 2014.
U.S. Appl. No. 15/145,177, filed May 3, 2016, Office Action, dated Jul. 29, 2016.
U.S. Appl. No. 14/289,599, filed May 28, 2014, Advisory Action, dated Sep. 4, 2015.
U.S. Appl. No. 15/145,177, filed May 3, 2016, Final Office Action, dated Aug. 7, 2015.
U.S. Appl. No. 14/319,765, filed Jun. 30, 2014, Advisory Action, dated Sep. 10, 2015.
U.S. Appl. No. 14/196,814, filed Mar. 4, 2014, Final Office Action, dated Dec. 14, 2016.
U.S. Appl. No. 14/196,814, filed Mar. 4, 2014, Notice of Allowance, dated Apr. 6, 2017.
U.S. Appl. No. 14/225,084, filed Mar. 25, 2014, Office Action, dated Sep. 11, 2015.
U.S. Appl. No. 14/196,814, filed Mar. 4, 2014, Final Office Action, dated Jun. 13, 2016.
U.S. Appl. No. 14/134,558, filed Dec. 19, 2013, Office Action, dated 10/07/20165.
U.S. Appl. No. 13/831,791, filed Mar. 15, 2013, Final Office Action, dated Aug. 6, 2015.
New Zealand Intellectual Property Office, "First Examination Report" in application No. 35215130/AJS, dated Apr. 1, 2014, 2 pages.
Official Communication for New Zealand Patent Application No. 622501 dated Apr. 1, 2014.
Official Communication for New Zealand Patent Application No. 622501 dated Jun. 5, 2014.
Official Communication for European Patent Application No. 14159447.3 dated Nov. 25, 2014.
Official Communication for European Patent Application No. 14159447.3 dated Jan. 8, 2015.
Official Communication for European Patent Application No. 15157642.8 dated Jul. 20, 2015.
U.S. Appl. No. 14/985,201, filed Dec. 30, 2015, Notice of Allowance, dated Apr. 18, 2018.
U.S. Appl. No. 14/077,159, filed Nov. 11, 2013, Notice of Allowance, dated Aug. 15, 2014.
Stack Overflow, How to use update trigger to update another table, May 2012, 2 pages.
U.S. Appl. No. 14/088,251, filed Nov. 22, 2013, Final Office Action, dated Apr. 18, 2016.
U.S. Appl. No. 13/831,199, filed Mar. 14, 2013, Notice of Allowance, dated Jan. 2, 2018.
U.S. Appl. No. 13/831,199, filed Mar. 14, 2013, Office Action, dated May 19, 2017.
U.S. Appl. No. 14/196,814, filed Mar. 4, 2014, Final Office Action, dated Dec. 18, 2014.
U.S. Appl. No. 15/145,177, filed May 3, 2016, Final Office Action, dated Dec. 2, 2016.
U.S. Appl. No. 14/196,814, filed Mar. 4, 2014, Interview Summary, dated Jul. 28, 2015.
U.S. Appl. No. 13/839,026, filed Mar. 15, 2013, Notice of Allowance, dated Mar. 11, 2016.
U.S. Appl. No. 14/580,218, filed Dec. 23, 2014, Final Office Action, dated Jan. 7, 2016.
U.S. Appl. No. 14/806,517, filed Jul. 22, 2015, Pre Interview Office Action, dated Oct. 26, 2016.
U.S. Appl. No. 14/985,201, filed Dec. 30, 2015, Pre Interview Office Action, dated Jun. 15, 2017.
U.S. Appl. No. 14/985,201, filed Dec. 30, 2015, Pre Interview Office Action, dated Oct. 3, 2017.
U.S. Appl. No. 13/838,815, filed Mar. 15, 2013, Notice of Allowance, dated Mar. 3, 2015.

* cited by examiner

SEARCH FIELDS 502

INPUT 504

4G LTE 📶    11:38 AM    🔋
< Back    Advanced Search

PROPERTIES

First: [ John ] [+]
          OR
       [ Jack ] [+]
          OR
       [ Johnny ] [+]

Last: [ Smith ]

Location: [ 37.3325798, -121.896093499 ] ⊕

DOB: [ 02/29/1980 ]

[ SEARCH ]

*Figure 5B*

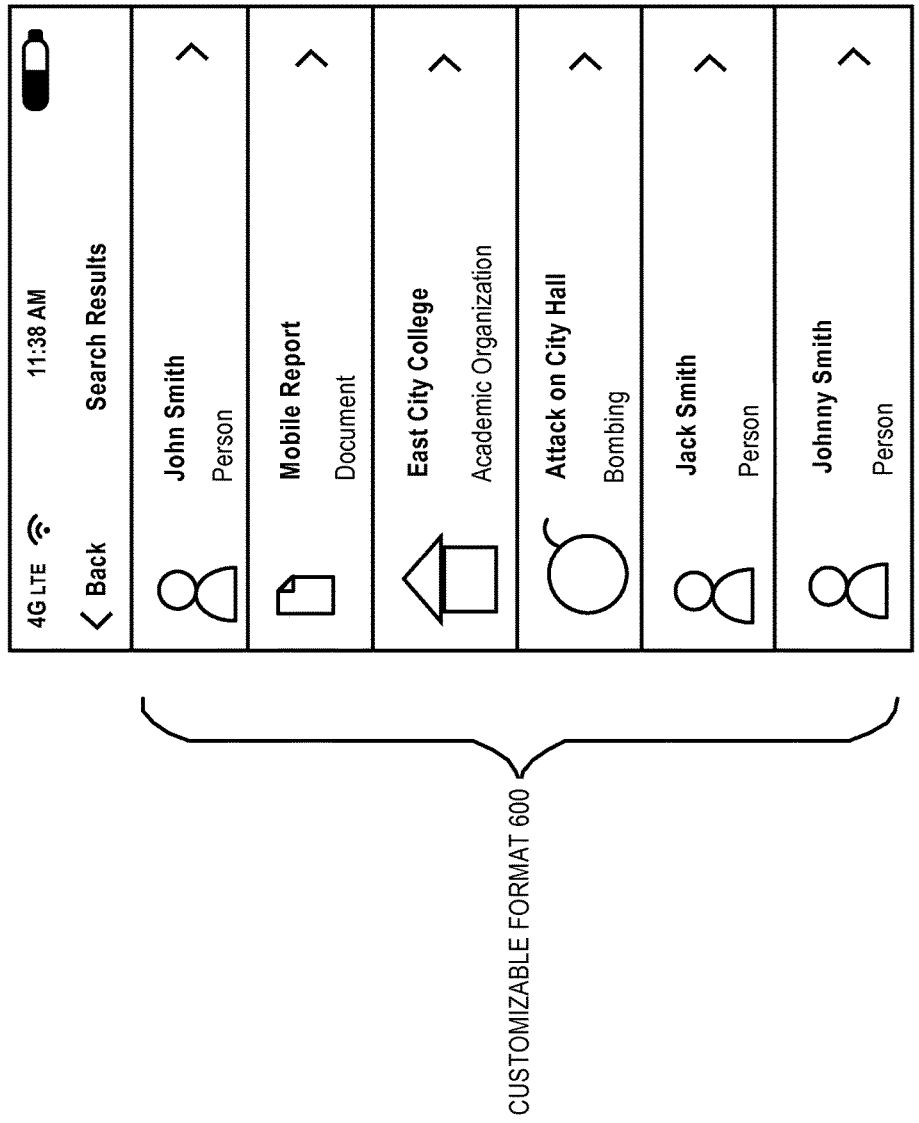

US 10,296,617 B1

SEARCHES OF HIGHLY STRUCTURED DATA

CROSS-REFERENCE TO RELATED APPLICATIONS

This application incorporates by reference the entirety of U.S. patent application Ser. No. 13/831,199, filed Mar. 14, 2013.

TECHNICAL FIELD

The present Application relates to information retrieval technology. More specifically, the example embodiment(s) described below relate to searches of highly structured data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers are very powerful tools for searching information. A search engine is a common mechanism that allows users to search for information using computers. A search engine accepts a search query as input. A search query is typically composed of one or more keywords and provides a search result as output. The search result identifies information that the search engine has determined "satisfies" the search query. Search engines often maintain an index of a corpus of information that allows the search engine to efficiently identify information in the corpus that satisfies a given search query.

One type of well-known search engine is an Internet search engine. Internet search engines are useful for searching semi-structured or unstructured data, such as the text content of a web page. However, the user interfaces of Internet search engines typically take a "one size fits all" approach with regard to how the user may scope the search. In particular, Internet search engines typically provide only a single text entry field into which the user enters one or more keywords. The Internet search engine then uses the entered keywords to identify information items that satisfy the entered keywords. This approach works well with the semi-structured and unstructured data that is indexed by Internet search engines, because such data typically is not represented by a highly-structured data model that is known to the user a priori the search. However, for highly structured data represented by a data model that the user has knowledge of prior to the search, the limited user interfaces provided by Internet search engines may be inadequate, inefficient, or cumbersome for users.

BRIEF DESCRIPTION OF THE DRAWINGS

The example embodiment(s) of the present Application are illustrated, by way of example and not limitation, in the accompanying drawings in which like reference numerals refer to similar elements and in which:

FIGS. 5A-C depict example approaches for obtaining input to search fields.

FIG. 6 depicts an example customizable format for search results.

DESCRIPTION OF THE EXAMPLE EMBODIMENT(S)

Figure 1:
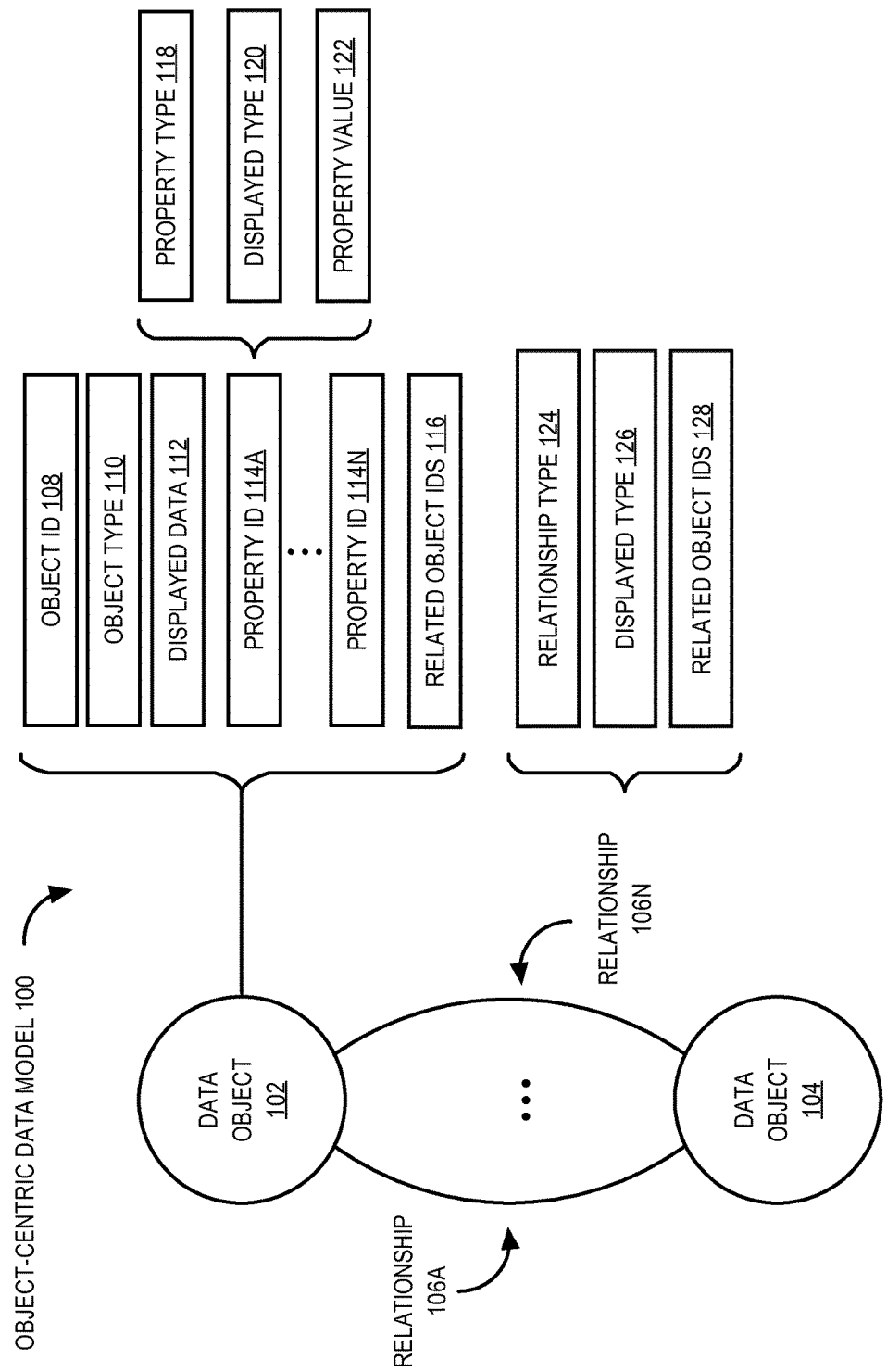
FIG. 1 depicts an example object-centric data model.

In the following description, for the purposes of explanation, numerous specific details are set forth in order to provide a thorough understanding of the example embodiment(s) of the present Application. It will be apparent, however, that the example embodiment(s) may be practiced without these specific details. In other instances, well-known structures and devices are shown in block diagram form in order to avoid unnecessarily obscuring the example embodiment(s). Modifiers such as "first" and "second" may be used to differentiate elements, but the modifiers do not necessarily indicate any particular order.

General Overview

Computer-implemented techniques for helping a user search a body of data that is highly structured are described. In some example embodiments, the body of data is represented by an object-centric data model. The object-centric data model is centered on the notion of data objects and properties of the data objects. Furthermore, the object-centric data model is based on an ontology that defines hierarchical object types and property types. For example, a data object in the body of data may have the hierarchical object type "Employee" and have a "Name" property, a "Title" property," and a "Salary" property. The ontology may define the "Employee" object type as a child object type of the "Person" object type. Thus, the "Employee" object is also a "Person" object according to the object-centric data model.

In some example embodiments, the techniques encompass a computer-implemented method performed at one or more computing devices. The one or more computing devices include one or more processors and storage media storing one or more computer programs executed by the one or more processors to perform the method.

Performance of the method includes performing the operation of receiving an indication of a search template to use for a search of the body of data represented by the object-centric data model. The search may have a scope specified by the template. In particular, the search template may specify one or more hierarchical object types, defined in the object-centric data model, that are within the scope of the search. The search template may also specify a plurality of search fields.

Performance of the method may further include performing the operations of: based on the search template, generating a user interface that includes the plurality of search fields; and providing the user interface to a user. For at least a couple of reasons, the user interface may allow a user to search the body of data more efficiently and with higher precision and recall. One reason is that searches of the body of data initiated via the user interface may be scoped according to the one or more hierarchical object types specified in the search template. Scoping a search may involve associating a set of search fields with the one or more hierarchical object types that are specified. Another reason is that the search fields presented to the user in the user interface may be limited to those that are relevant to the one or more hierarchical object types specified in the search template. In other words, each search field may impose a property restriction on the search, the property restriction being dependent on the one or more hierarchical object types that are specified.

Example Object-Centric Data Model

FIG. 1 depicts an example object-centric data model. Referring to FIG. 1, object-centric data model 100 includes data objects 102, 104 and relationships 106A-N. Data object 102 includes object ID 108, object type 110, displayed data 112, property IDs 114A-N, and related object IDs 116. Property ID 114A is associated with property type 118, displayed type 120, and property value 122. Relationship 106N is associated with relationship type 124, displayed type 126, and related object IDs 128.

Object-centric data model 100 may be a logical data model that defines how data is represented. Object-centric data model 100 may be independent of any data storage model. For example, data may be stored in a relational database or a key-value store and still be represented by object-centric data model 100.

At a minimum, object-centric data model 100 is built on the notion of a data object 102, 104. A data object 102, 104 may represent a particular person, a particular location, a particular organization, a particular event, a particular document, or other instance of a noun. For example, a particular data object may correspond to "Barack Obama", "San Francisco", "Stanford University", "2008 Financial Crisis", etc.

A data object 102, 104 may be associated with zero or more properties. A property of a data object 102, 104 may be an attribute of the data object 102, 104 and may represent an individual data item. For example, a property may include a name, height, weight, or phone number of a person.

Data objects 102, 104 may be related based on one or more relationships 106A-N. A relationship 106A-N may be symmetric or asymmetric. For example, a pair of data objects 102, 104 may be related by an asymmetric "child of" relationship and/or a symmetric "kin of" relationship.

At the highest level of abstraction, a data object 102, 104 may be a container for information. The information may include object ID 108, object type 110, displayed data 112, property IDs 114A-N, related object IDs 116, any associated media (e.g., image, video recording, audio recording), any links to associated media, and/or any other data relevant to the data object 102, 104.

Data objects 102, 104 may be referenced based on unique identifiers that uniquely identify each data object 102, 104. Thus, a particular data object may store object ID 108, which is the unique identifier assigned to the particular data object. The particular data object may also store one or more related object IDs 116, which are the unique identifiers assigned to data objects 102, 104 that share one or more relationships 106A-N with the particular data object.

Object type 110 may indicate a category of data objects 102, 104. Example categories include "person", "location", "organization", "event", and "document". The category may be indicated by a Uniform Resource Identifier (URI). For example, if a particular data object represents "Barack Obama", then object type 110 may be "com.palantir.object.person".

Displayed data 112 may be a user-friendly representation of a particular data object. For example, displayed data 112 may include a user-friendly version of object type 110, such as "Person"; a commonly used name for the particular data object, such as "Barack Obama"; and/or a thumbnail preview of the particular data object.

If a particular data object is associated with any properties, the particular data object may store property IDs 114A-N. Each property ID of property IDs 114A-N may be associated with a property type 118, a displayed type 120, and one or more property values 122.

Property type 118 may indicate a category of properties, and displayed type 120 may be a user-friendly version of property type 118. For example, if property type 118 is "com.palantir.property.name", then displayed type 120 may be "Name". A particular data object may have multiple properties of the same type. For example, a person may have multiple aliases.

Property value 122 may include one or more values of a particular property. Multiple values may correspond to component values. For example, the property value 122 "Barack Obama" may be broken down into component values "Barack" and "Obama".

If a particular data object stores any related object IDs 116, a search for matching object identifiers may be performed to determine a relationship 106A-N with the particular data object. Each relationship of relationships 106A-N may be associated with a relationship type 124, a displayed type 126, and related object IDs 128.

Relationship type 124 may indicate a category of relationships 106A-N, and displayed type 126 may be a user-friendly version of relationship type 124. For example, if relationship type 124 is "com.palantir.relationship.appearsin", then displayed type 126 may be "Appears In". In other words, a search of data object 102 may cause displaying of displayed type 126 of relationship 106A and/or displayed data 112 of data object 104. Any further data related to data object 104 may be retrieved based on an additional search.

Example Ontology

Figure 2:
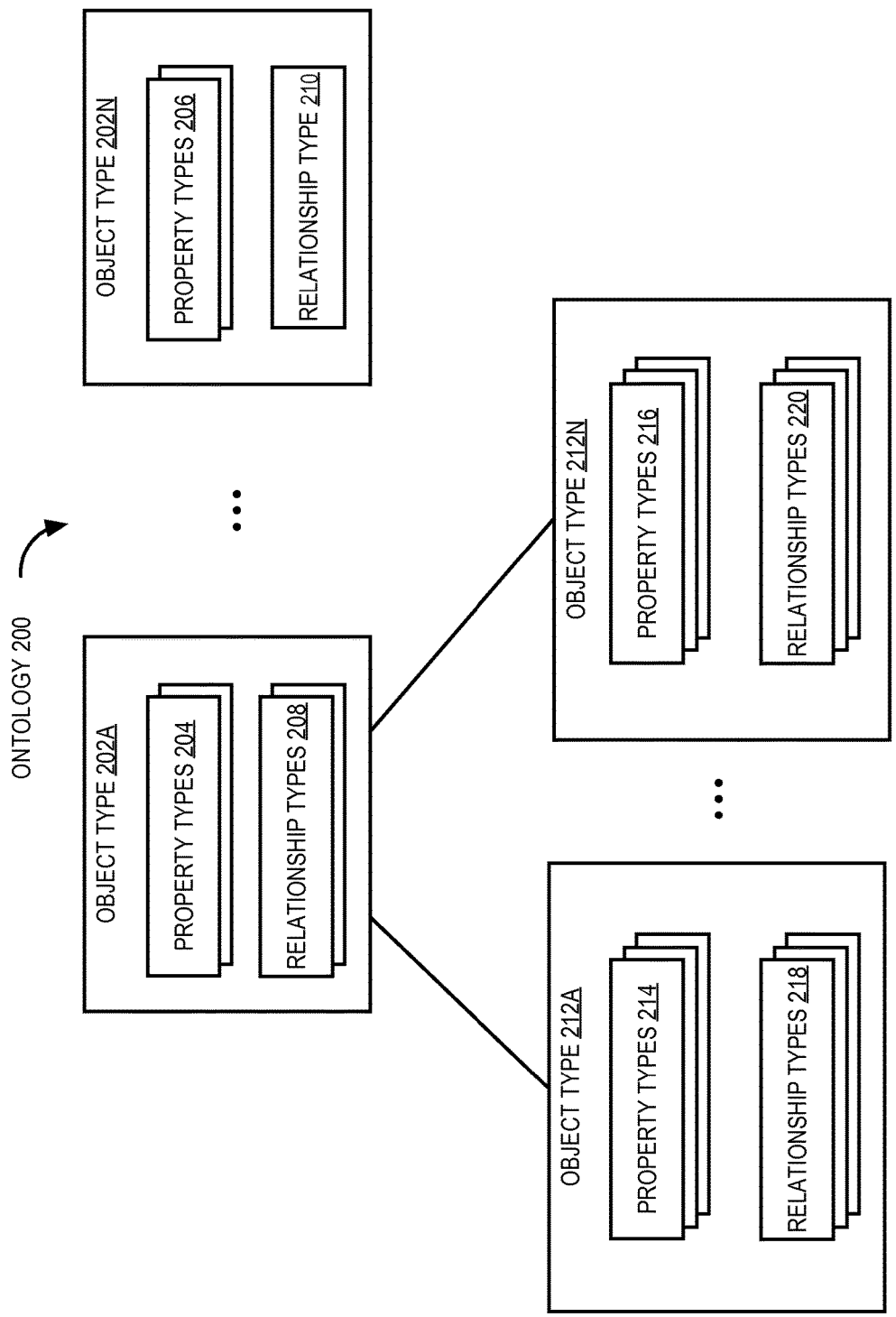
FIG. 2 depicts an example ontology.

Object-centric data model 100 may include a hierarchical data type ontology. FIG. 2 depicts an example ontology. Referring to FIG. 2, ontology 200 includes object types 202A-N, 212A-N. Each object type of object types 202A-N, 212A-N is associated with property types 204, 206, 214, 216 and one or more relationship types 208, 210, 218, 220.

Ontology 200 may be a hierarchical organization of object types 202A-N, 212A-N; property types 204, 206, 214, 216; and/or relationship types 208, 210, 218, 220. In other words, ontology 200 may define which of the property types 204, 206, 214, 216 and/or relationship types 208, 210, 218, 220 correspond to a particular object type. Ontology 200 may be static or dynamic, depending on whether it can be modified by an end user.

In the example of FIG. 2, object types 202A and 202N share the same hierarchical level but correspond to different hierarchical object types. For example, object types 202A and 202N may correspond to the hierarchical object types "Person" and "Location", respectively. Different hierarchical object types may be associated with one or more different property types 204, 206, 214, 216 and/or one or more different relationship types 208, 210, 218, 220. For example, property types 204 may include "Name", "Height", "Weight", and/or any other property types 204 that are relevant to the hierarchical object type "Person". In contrast, property types 206 may include "Name", "Latitude", "Longitude", and/or any other property types 206 that are relevant to the hierarchical object types "Location".

In FIG. 2, object types 212A-N are depicted as descending from object type 202A. In other words, object types 212A-N may be sub-types of object type 202A. For example, object types 212A and 212N correspond to the hierarchical object types "Teacher" and "Lawyer", which are both sub-types of "Person". Thus, object types 212A-N may inherit property types 204 and relationship types 208 from object type 202A. For example, property types 214 may include property types 204 and one or more additional property types 214 that are relevant to the hierarchical object type "Teacher". However, property types 214 and property types 216 may differ in at least one property type 214, 216. For example, property types 214 may include the property type "Grades Taught", whereas property types 216 may include the property type "Bar Admissions".

Hierarchical object types that share the same hierarchical level may be disjunctive and may involve disjunctive searches. For example, object types 212A and 212N may be disjunctive insofar as a data object 102, 104 associated with object type 212A is excluded from association with object type 212N. Thus, object types 212A and 212N may be searched separately.

In contrast, a search of a particular hierarchical object type may be equivalent to searching each sub-type of the particular hierarchical object type. For example, a single search of object type 202A may be the equivalent of separate searches of object types 212A-N.

Example User Interface

Figure 3:
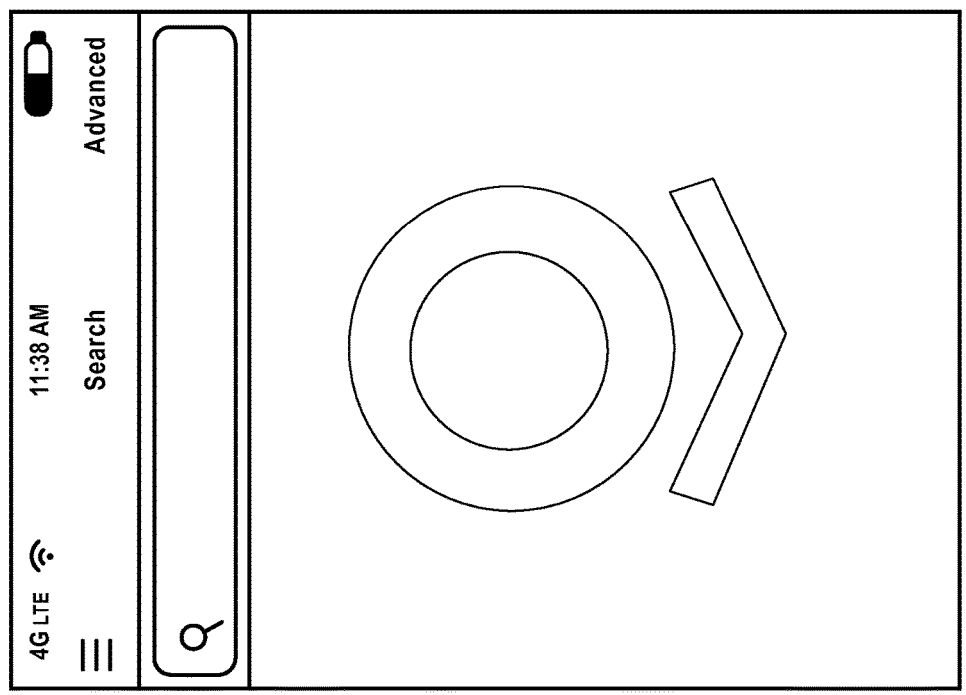
FIG. 3 depicts an example user interface.

Searches of highly structured data may be initiated based on input at a user interface. FIG. 3 depicts an example user interface. Referring to FIG. 3, user interface 300 is provided to a user of a client device.

In the example of FIG. 3, user interface 300 is associated with a native mobile application on a smartphone. In FIG. 3, user interface 300 includes a single search field for accepting one or more keywords as input. However, clicking "Advanced" (e.g., via a touch screen) may cause a different user interface to be provided to the user.

Example Plurality of Search Templates

Figure 4:
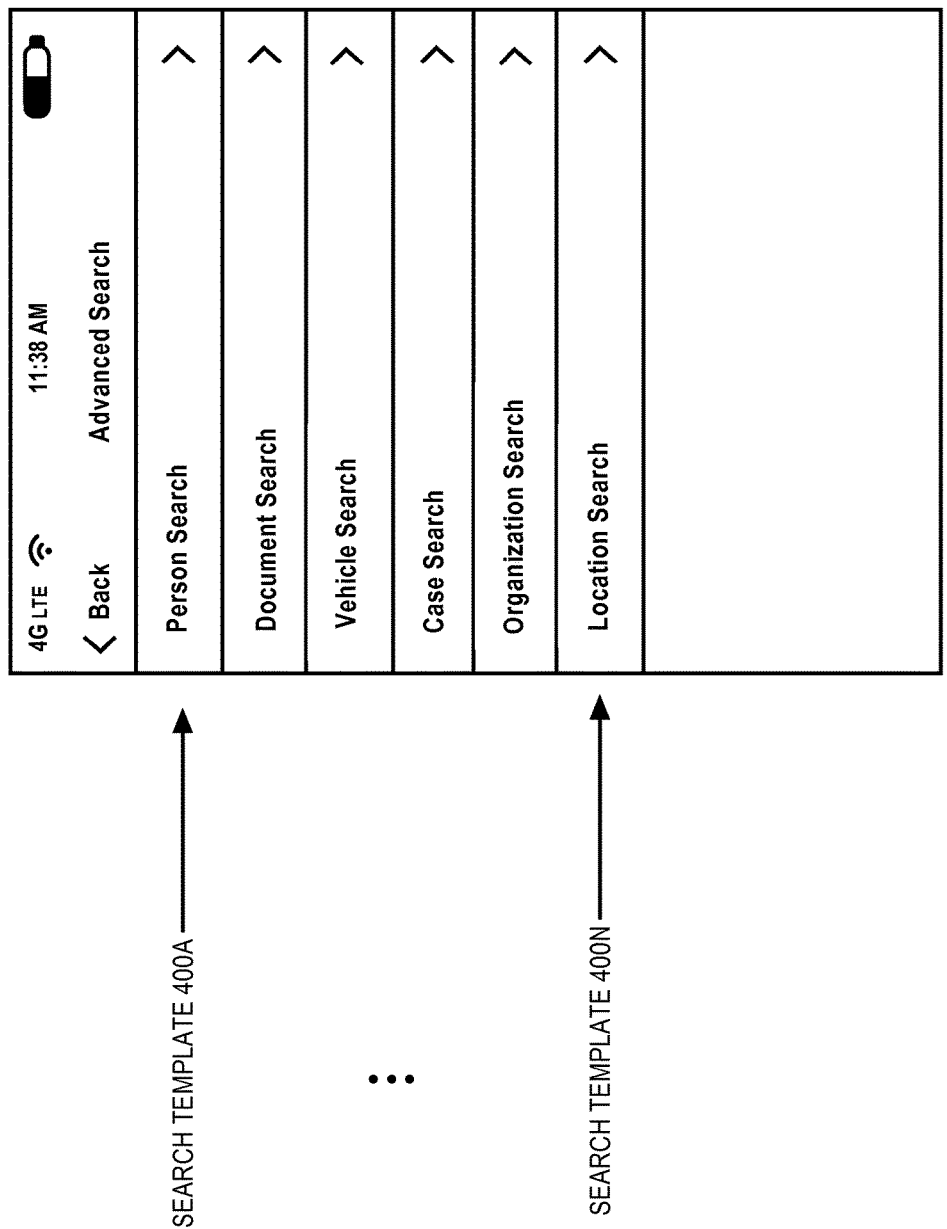
FIG. 4 depicts a plurality of example search templates.

The different user interface may include a plurality of search templates. FIG. 4 depicts a plurality of example search templates. Referring to FIG. 4, search templates 400A-N are provided to the user.

Search templates 400A-N translate user intent into search queries. Each search template of search templates 400A-N specifies a scope of a search of data represented by an object-centric data model 100. As shall be described in greater detail below, the scope of the search may be defined by a plurality of search fields specified by a selected search template.

Each search template of search templates 400A-N specifies one or more hierarchical object types within the scope of the search. The one or more hierarchical object types may include disjunctive object types. Additionally or alternatively, the one or more hierarchical object types may include a hierarchical object type as well as a sub-type of the hierarchical object type.

For example, in FIG. 4, search template 400A corresponds to the hierarchical object type "Person". As mentioned above, a search of a particular object type may be equivalent to searching each sub-type of the particular object type. Thus, any sub-type of a hierarchical object type that is within the scope of the search is also within the scope of the search. For example, the hierarchical object types "Teacher" and "Lawyer" are also within the scope of the search specified by search template 400A. In other words, a "Person" search may be implemented as separate searches of "Teacher" and "Lawyer" that are performed disjunctively.

In another example, a user may modify the plurality of search templates 400A-N of FIG. 4 to include a customized search template that specifies the hierarchical object types "Person" and "Location". The customized search template may be generated by editing an existing search template or creating a new search template. Thus, the customized search template may specify disjunctive searches of "Person" and "Location".

Approaches for Obtaining Input to Search Fields

Figure 5A:
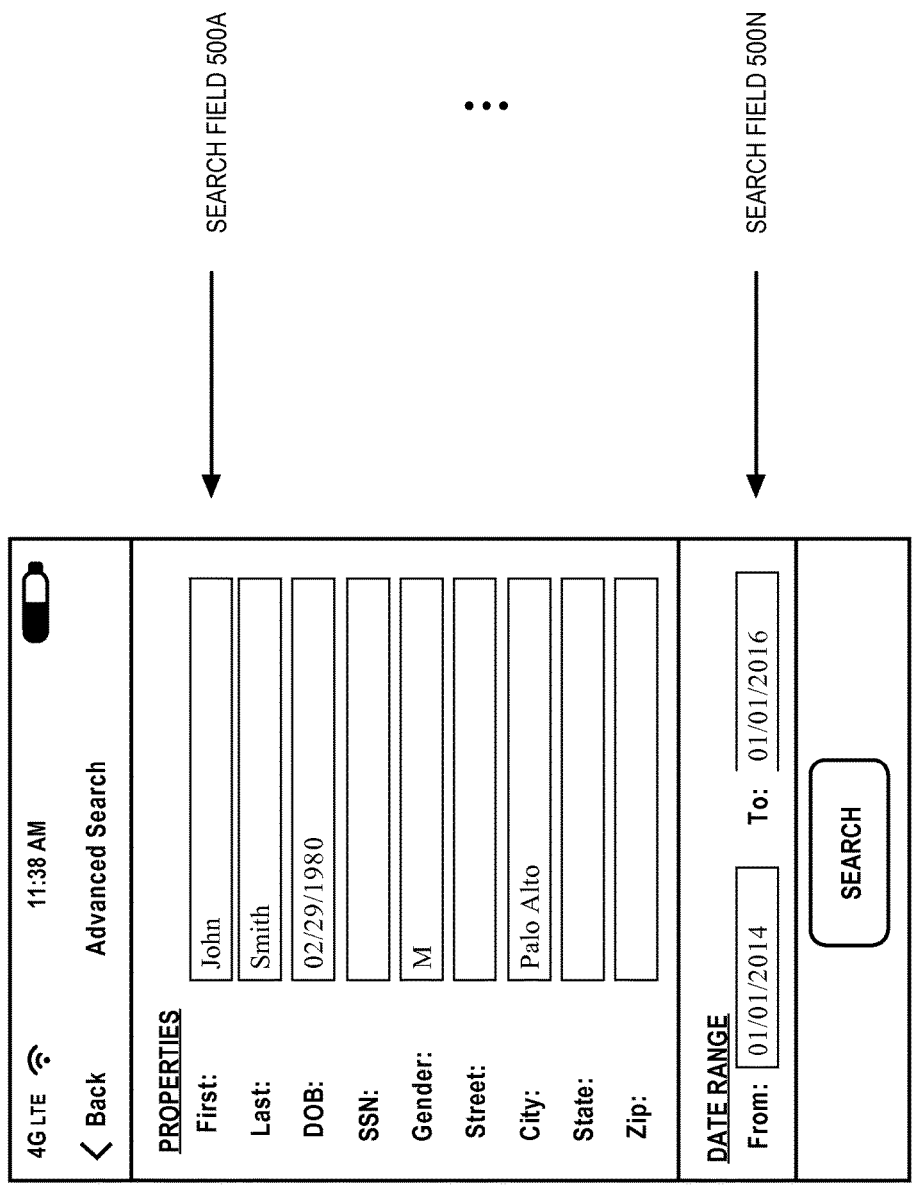

Selecting a particular search template may cause generating a user interface 300 that includes a plurality of search fields. For example, FIG. 5A depicts an example plurality of search fields 500A-N provided to the user in response to selecting a particular search template. In an embodiment, a search field may accept a keyword and/or a property value 122 as input.

Each search template of search templates 400A-N may specify search fields 500A-N that correspond to relevant property types associated with one or more data objects 102, 104 that are within the scope of the search defined by the search template. In the example of FIG. 5A, the particular search template may be a customized search template specifying disjunctive searches for a "Person" and a "Document". Thus, search fields 500A-N may correspond to relevant property types associated with the hierarchical object types "Person" and "Document".

Each search field of the plurality of search fields 500A-N may be associated with a displayed type 120. For example, search field 500A follows the displayed type 120 "First". Furthermore, each search field of the plurality of search fields 500A-N accepts input specifying a property value 122. For example, search field 500A accepts input specifying the property value 122 "John". Note that input need not be provided to all of the search fields 500A-N. Furthermore, there may be hidden search fields associated with fixed property values, such as "USA" in a hidden "Country" search field.

Referring to FIG. 5A, there is a "Properties" section that includes search field 500A (hereinafter "property filter"). A property filter may specify a conjunctive search for each property type 118 that is provided with a property value 122. For example, a conjunctive search may be performed for the first name "John" and the last name "Smith".

FIG. 5A also depicts a "Date Range" section that includes search field 500N (hereinafter "intrinsic date search"). An intrinsic date search is typically used with the hierarchical object types "Document" and "Event". An "intrinsic date" may be a date of creation, a date of occurrence, a date of publication, or any other property that can be represented as a date.

A particular search field may obtain input in any of a number of different ways. Each search field of the plurality of search fields 500A-N is associated with an input type (e.g., SIMPLE, DATE, NUMERIC, ENUM, MAP). Thus, search fields 500A-N may include a text entry field, a date picker, a numeric keypad, a selectable list, an interactive map, or any other interface for obtaining input. FIG. 5B depicts a user interface 300 that obtains input in multiple ways.

Referring to FIG. 5B, each search field of search fields 502 corresponds to the same property type "First". Selecting a "+" button may add an additional search field to search fields 502. Search fields 502 are disjunctive search fields. In other words, each property value 122 provided to search fields 502 may be searched disjunctively. However, search fields 502 may still be searched conjunctively with any other search fields.

FIG. 5B also depicts input 504 obtained for the property type "Location". Input 504 may have been obtained based on selecting the crosshairs button adjacent to the "Location" search field. The crosshairs button may have caused the user to be provided with the interface depicted in FIG. 5C.

Figure 5C:
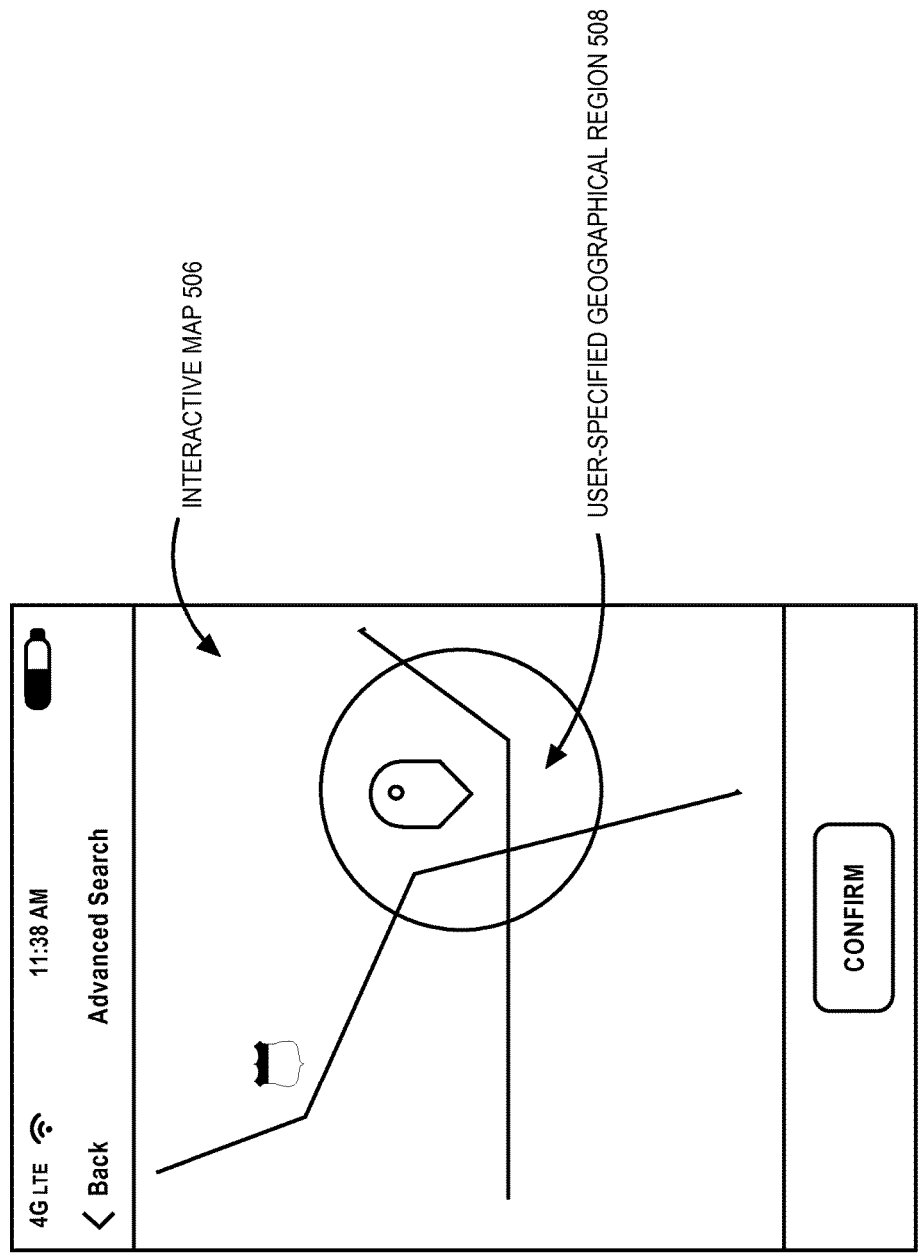

FIG. 5C depicts an example map interface including an interactive map 506. The user may add a geolocation pin to the interactive map 506. The geolocation pin may indicate a particular location and/or the center of a geographical region relevant to a search. For example, a geo-fenced search may be performed based on a user-specified geographical region 508. Thus, a particular search template may restrict a search to one or more locations. For example, the particular search template may restrict a scope of a search to one or more geographic regions.

In an embodiment (not shown), an input 504 to a particular search field may be obtained from a camera and/or any other hardware of the client computer at which the user interface 300 is displayed. For example, a camera may be used to populate search fields with measurements (e.g., distance between eyes, length of face, width of face) that can be used for face recognition.

Example Customizable Format for Search Results

After a search is performed, search results may be retrieved and provided to the user. The search results may be provided in any number of different formats, which may be customized by the user. FIG. 6 depicts an example customizable format for search results.

Referring to FIG. 6, customizable format 600 includes a list of search results. The list may be arranged in any order. For example, the list may be organized based on hierarchical object type.

Search results may be presented in any of a number of different ways. Each search result may include some or all of the displayed data 112 associated with the search result. Additionally or alternatively, one or more search results may be plotted on a map. Additionally or alternatively, the search results may be represented graphically using any of the techniques described in U.S. patent application Ser. No. 13/608,864, filed Sep. 10, 2012, the entirety of which is incorporated herein by reference. Additionally or alternatively, the search results may be provided as selectable histograms using any of the techniques described in U.S. patent application Ser. No. 14/676,621, filed Apr. 1, 2015, the entirety of which is incorporated herein by reference.

In addition to the search results, the user may be provided with past search results. For example, the results of recent searches may be provided to the user as a list. Current and/or past search results may be used to modify search templates 400A-N.

Example Detailed Views of a Search Result

Figure 7:
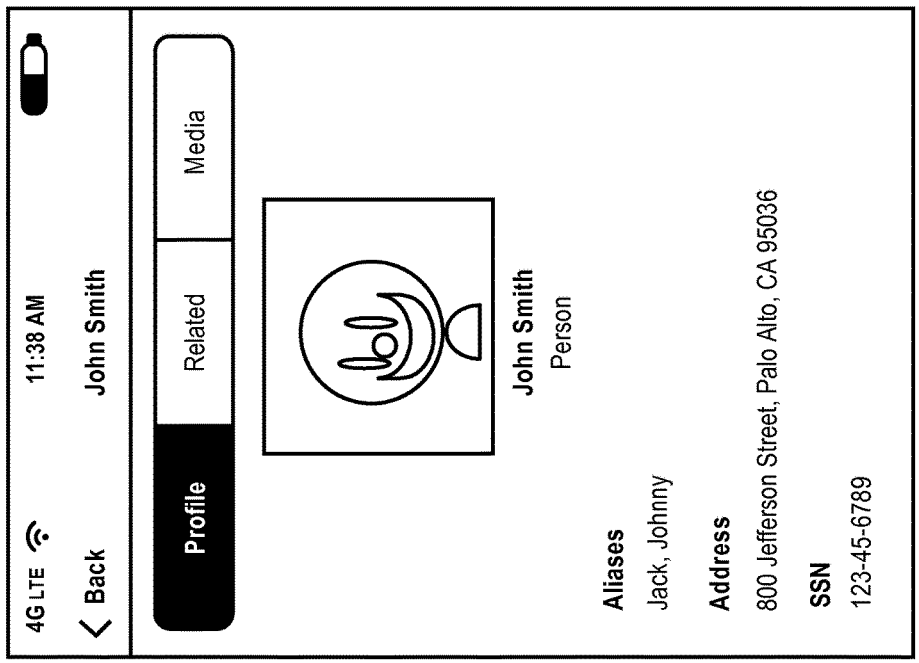
FIGS. 7-9 depict example detailed views of a search result.
Figure 8:
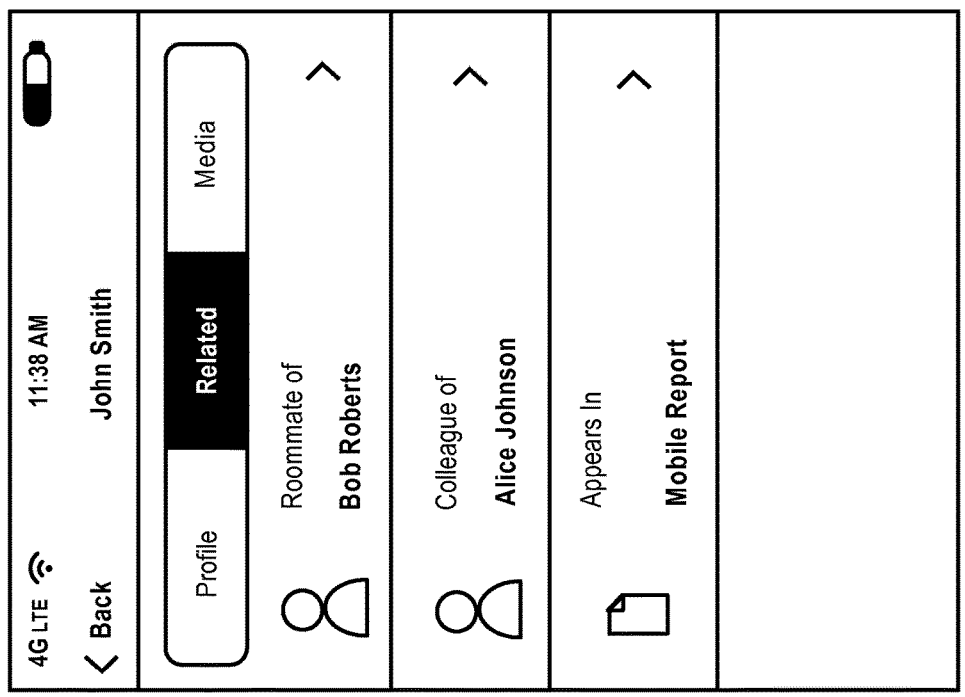
Figure 9:
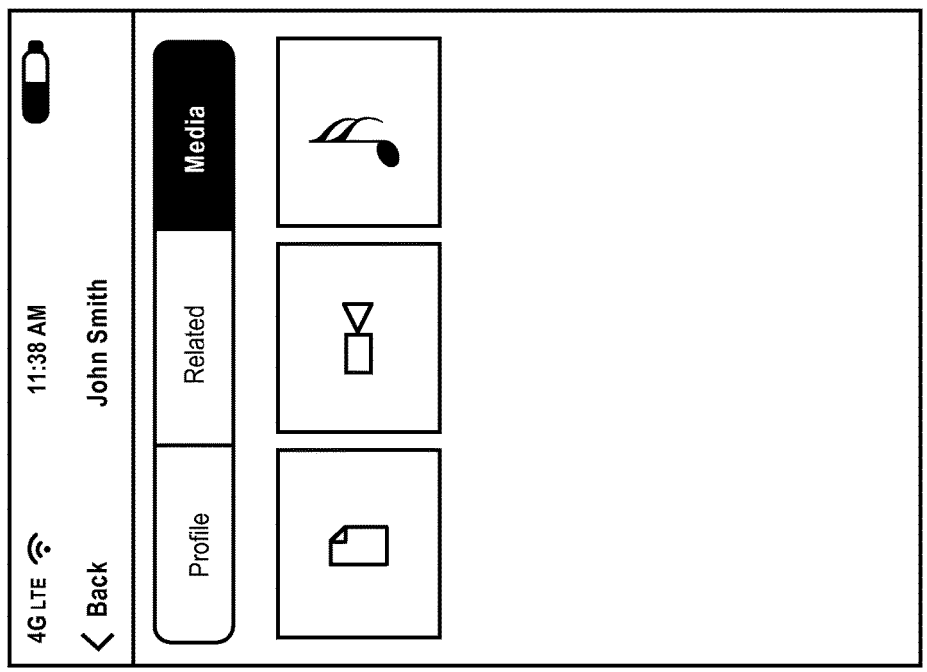

Selecting a particular search result may cause the user to be provided with one or more detailed views of the particular search result. FIGS. 7-9 depict example detailed views of a search result.

FIG. 7 depicts an example "Profile" view. This view may include a summary of properties associated with a particular data object. In the example of FIG. 7, this view includes displayed data 112 associated with the particular data object as well as displayed type 120 and property value 122 for each property of the particular data object.

The user can do any of a number of things with a particular data object obtained as a search result. The user can edit the particular data object. For example, the user can modify a property and store the modified data object in the data store from which the unmodified data object was retrieved. Additionally or alternatively, the user can share the particular data object with another user. For example, the user may send a link to the particular data object to another user. Additionally or alternatively, the user can specify additional searches to be performed based on the particular data object using any of the techniques described in U.S. patent application Ser. No. 13/608,864. Additionally or alternatively, a search result may be geotagged (e.g., associated with a particular location).

FIG. 8 depicts an example "Related" view. This view may include any data objects 102, 104 that are related to the particular data object obtained as a search result. In the example of FIG. 8, this view includes displayed type 126 of each relationship between the particular data object and a related data object as well as the displayed data 112 associated with the related data object.

FIG. 9 depicts an example "Media" view. This view may include links to any media data associated with the particular data object obtained as a search result. Selecting a media link may cause media data to be rendered in a suitable manner. For example, selecting a video file may cause the video file to be presented in a video player.

Process Overview

Figure 10:
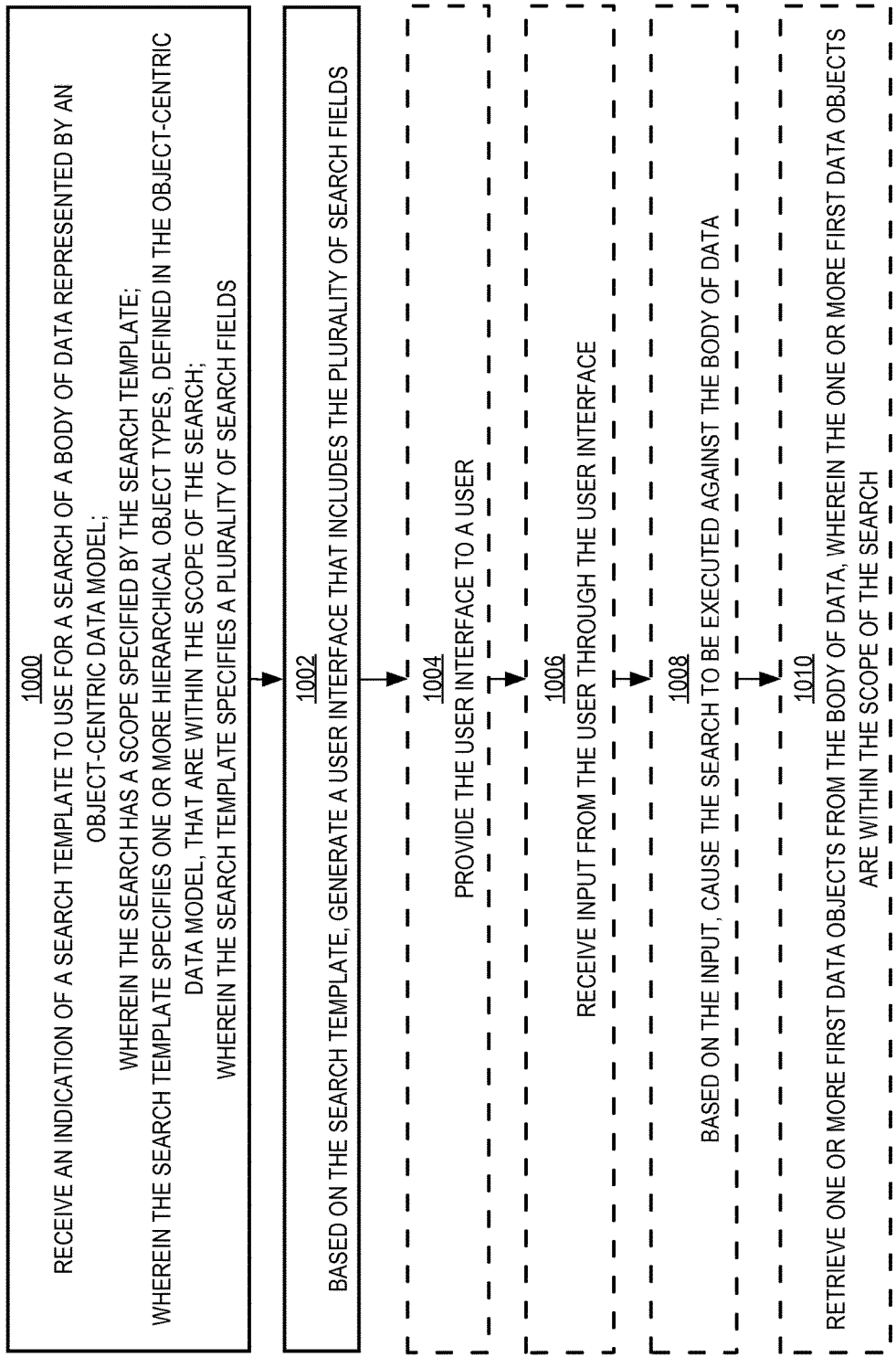
FIG. 10 is a flow diagram that depicts an approach for searching highly structured data, according to some example embodiments of the present invention.

FIG. 10 is a flow diagram that depicts an approach for searching highly structured data. At block 1000, an indication of a search template is received. The indication may include user input (e.g., input indicating a user's selection of a search template in a user interface) and/or a network message (e.g., a HTTP message that indicates a user's selection of a search template). The indication may specify that the search template is to be used for a search of data represented by an object-centric data model. The search template may specify the scope of the search, which may include one or more hierarchical object types that are defined in the object-centric data model. The search template may also specify a plurality of search fields.

For example, a user may select a "Person" search template. The "Person" search template may specify that a search is to be performed for data belonging to the "Person" object type. A "Person" object type is associated with certain property types. Thus, selecting the "Person" search template specifies these property types.

At block 1002, a user interface is generated based on the search template. The user interface may include the plurality of search fields. For example, the property types specified by the "Person" search template may translate into search fields corresponding to a person's name, age, address, phone number, etc.

At optional block 1004, the user interface is provided to a user. For example, search fields may be provided to the user so that the user can input property values to be matched when the search is performed.

At optional block 1006, input is received from the user through the user interface. The input may be in any of a number of formats. For example, the input may be a text entry, an interaction with a map, a selection from an enumerated list, etc.

At optional block 1008, the search is performed based on the input. For example, text input may be enclosed with wildcard operators, such as "*", and matched against stored property values.

At optional block 1010, one or more first data objects are retrieved as a result of performing the search. The one or more first data objects are data objects that fell within the scope of the search. Any of a number of subsequent actions may be performed based on the one or more first data objects, including searching for one or more second data object that did not fall within the scope of the search.

Example Computer System

Figure 11:
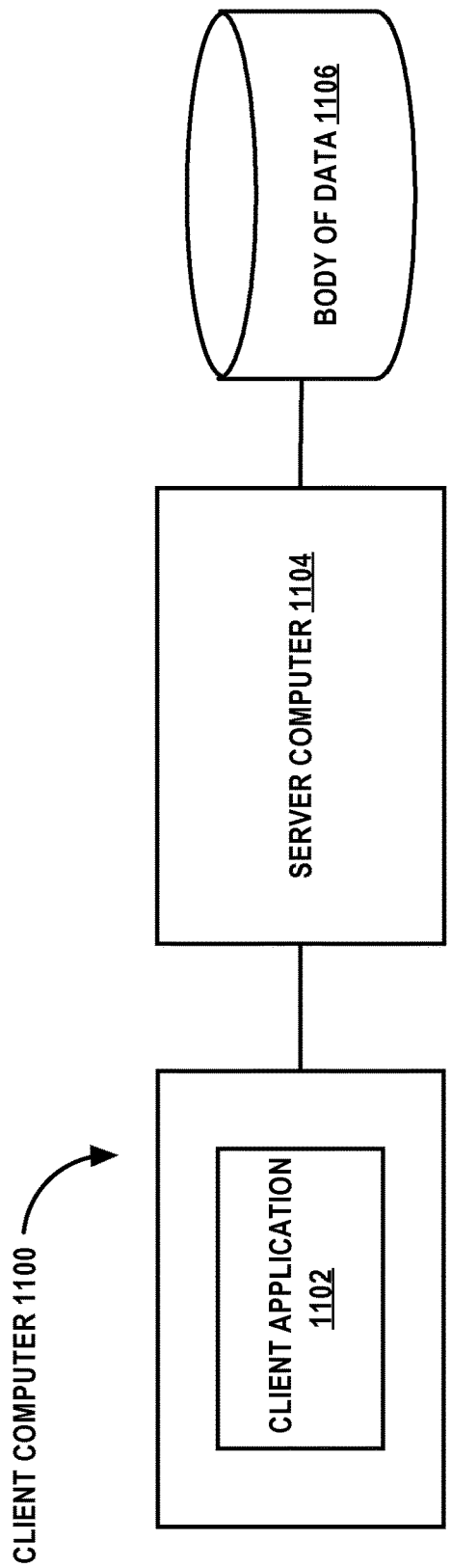
FIG. 11 depicts an example computer system in which embodiments may be implemented.

FIG. 11 depicts an example computer system in which embodiments may be implemented. Referring to FIG. 11, client computer 1100 includes client application 1102. Client computer 1100 is communicatively coupled to server computer 1104, which is communicatively coupled to body of data 1106.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

Client application 1102 may be a sequence of instructions executing at client computer 1100. At a minimum, client application 1102 may provide, to a user, any of the interfaces described in FIGS. 2-9. For example, client application 1102 may be a program executing in a web browser or a native mobile app. Client application 1102 may be installed on client computer 1100 to provide any of a number of benefits. The benefits may include faster execution, lower network latency and bandwidth consumption, and/or better access to the hardware of client computer 1100. Furthermore, a client application 1102 installed on client computer 1100 enables the client application 1102 to operate in an offline mode. For example, search results may be saved locally on client computer 1100 so that a user can interact with them without an Internet connection.

Server computer 1104 may include one or more computers, such as a web server, a mobile server, a gateway server, and/or a load-balancing server. A gateway server may regulate access to other servers, including structured data servers and unstructured data servers. Structured data servers may be computers that facilitate searches of structured data, such as data stored in an object-centric data model. Unstructured data servers may be computers that facilitate searches of unstructured data, such as by implementing text searches of documents. Server computer 1104 may send data to client computer 1100 using JavaScript Object Notation (JSON), Extensible Markup Language (XML), and/or any other data interchange format.

Body of data 1106 may represent the data being searched. For example, body of data 1106 may be stored in a database, a configuration file, and/or any other system and/or data structure that stores data. Additionally or alternatively, body of data 1106 may be stored in memory on server computer 1104. Additionally or alternatively, body of data 1106 may be stored in non-volatile storage. For example, body of data 1106 may be stored in a mobile database communicatively coupled to a mobile server and/or a repository communicatively coupled to a gateway server.

A user's access to body of data 1106 may be limited based on access controls. Thus, a search of a body of data 1106 may be restricted to data to which the user has access.

Basic Computing Device

Figure 12:
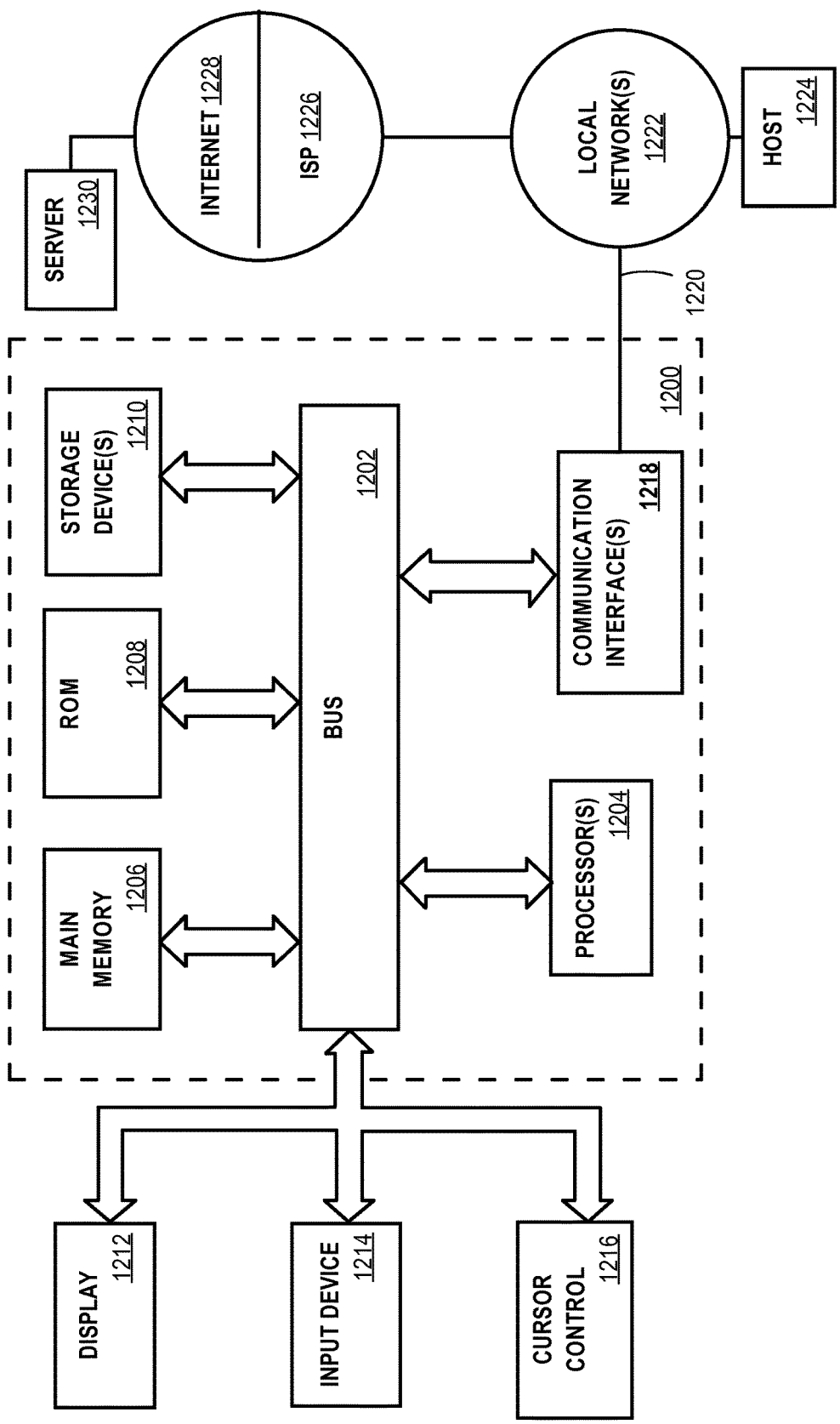
FIG. 12 is a very general block diagram of a computing device in which the example embodiment(s) of the present Application may be embodied.

Referring now to FIG. 12, it is a block diagram that illustrates a basic computing device 1200 in which the example embodiment(s) of the present Application may be embodied. Computing device 1200 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1200 may include a bus 1202 or other communication mechanism for addressing main memory 1206 and for transferring data between and among the various components of device 1200.

Computing device 1200 may also include one or more hardware processors 1204 coupled with bus 1202 for processing information. A hardware processor 1204 may be a general purpose microprocessor, a system on a chip (SoC), or other processor.

Main memory 1206, such as a random access memory (RAM) or other dynamic storage device, also may be coupled to bus 1202 for storing information and software instructions to be executed by processor(s) 1204. Main memory 1206 also may be used for storing temporary variables or other intermediate information during execution of software instructions to be executed by processor(s) 1204.

Software instructions, when stored in storage media accessible to processor(s) 1204, render computing device 1200 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1200 also may include read only memory (ROM) 1208 or other static storage device coupled to bus 1202 for storing static information and software instructions for processor(s) 1204.

One or more mass storage devices 1210 may be coupled to bus 1202 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1210 (e.g., the main hard disk for the device) stores a body of program and data for directing operation of the computing device, including an operating system, user application programs, driver and other support files, as well as other data files of all sorts.

Computing device 1200 may be coupled via bus 1202 to display 1212, such as a liquid crystal display (LCD) or other electronic visual display, for displaying information to a computer user. In some configurations, a touch sensitive surface incorporating touch detection technology (e.g., resistive, capacitive, etc.) may be overlaid on display 1212 to form a touch sensitive display for communicating touch gesture (e.g., finger or stylus) input to processor(s) 1204.

An input device 1214, including alphanumeric and other keys, may be coupled to bus 1202 for communicating information and command selections to processor 1204. In addition to or instead of alphanumeric and other keys, input device 1214 may include one or more physical buttons or switches such as, for example, a power (on/off) button, a "home" button, volume control buttons, or the like.

Another type of user input device may be a cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

While in some configurations, such as the configuration depicted in FIG. 12, one or more of display 1212, input device 1214, and cursor control 1216 are external components (i.e., peripheral devices) of computing device 1200, some or all of display 1212, input device 1214, and cursor control 1216 are integrated as part of the form factor of computing device 1200 in other configurations.

Functions of the disclosed systems, methods, and modules may be performed by computing device 1200 in response to processor(s) 1204 executing one or more programs of software instructions contained in main memory 1206. Such software instructions may be read into main memory 1206 from another storage medium, such as storage device(s) 1210. Execution of the software instructions contained in main memory 1206 cause processor(s) 1204 to perform the functions of the example embodiment(s).

While functions and operations of the example embodiment(s) may be implemented entirely with software instructions, hard-wired or programmable circuitry of computing device 1200 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more software instructions to processor(s) 1204 for execution. For example, the software instructions may initially be carried on a magnetic disk or solid-state drive of a remote computer. The remote computer can load the software instructions into its dynamic memory and send the software instructions over a telephone line using a modem. A modem local to computing device 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor(s) 1204 retrieves and executes the software instructions. The software instructions received by main memory 1206 may optionally be stored on storage device(s) 1210 either before or after execution by processor(s) 1204.

Computing device 1200 also may include one or more communication interface(s) 1218 coupled to bus 1202. A communication interface 1218 provides a two-way data communication coupling to a wired or wireless network link 1220 that is connected to a local network 1222 (e.g., Ethernet network, Wireless Local Area Network, cellular phone network, Bluetooth wireless network, or the like). Communication interface 1218 sends and receives electrical, electromagnetic, or optical signals that carry digital data streams representing various types of information. For example, communication interface 1218 may be a wired network interface card, a wireless network interface card with an integrated radio antenna, or a modem (e.g., ISDN, DSL, or cable modem).

Network link(s) 1220 typically provide data communication through one or more networks to other data devices. For example, a network link 1220 may provide a connection through a local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network(s) 1222 and Internet 1228 use electrical, electromagnetic or optical signals that carry digital data streams. The signals through the various networks and the signals on network link(s) 1220 and through communication interface(s) 1218, which carry the digital data to and from computing device 1200, are example forms of transmission media.

Computing device 1200 can send messages and receive data, including program code, through the network(s), network link(s) 1220 and communication interface(s) 1218. In the Internet example, a server 1230 might transmit a requested code for an application program through Internet 1228, ISP 1226, local network(s) 1222 and communication interface(s) 1218.

The received code may be executed by processor 1204 as it is received, and/or stored in storage device 1210, or other non-volatile storage for later execution.

Basic Software System

Figure 13:
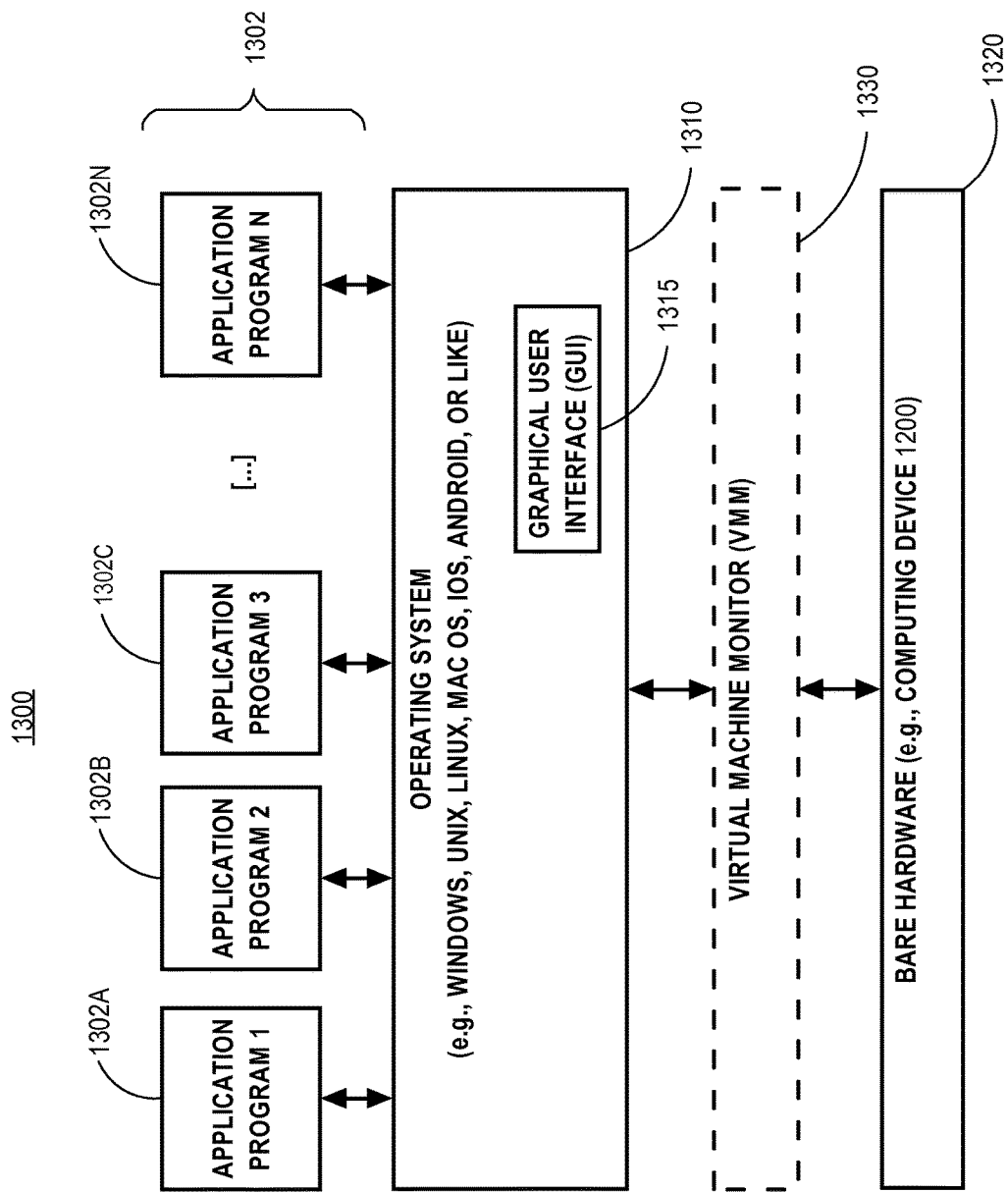
FIG. 13 is a block diagram of a basic software system for controlling the operation of the computing device.

FIG. 13 is a block diagram of a basic software system 1300 that may be employed for controlling the operation of computing device 1200. Software system 1300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1300 is provided for directing the operation of computing device 1200. Software system 1300, which may be stored in system memory (RAM) 1206 and on fixed storage (e.g., hard disk or flash memory) 1210, includes a kernel or operating system (OS) 1310.

The OS 1310 manages low-level aspects of computer operation, including managing execution of processes, memory allocation, file input and output (I/O), and device I/O. One or more application programs, represented as 1302A, 1302B, 1302C . . . 1302N, may be "loaded" (e.g., transferred from fixed storage 1210 into memory 1206) for execution by the system 1300. The applications or other software intended for use on device 1300 may also be stored as a set of downloadable computer-executable instructions, for example, for downloading and installation from an Internet location (e.g., a Web server, an app store, or other online service).

Software system 1300 includes a graphical user interface (GUI) 1315, for receiving user commands and data in a graphical (e.g., "point-and-click" or "touch gesture") fashion. These inputs, in turn, may be acted upon by the system 1300 in accordance with instructions from operating system 1310 and/or application(s) 1302. The GUI 1315 also serves to display the results of operation from the OS 1310 and application(s) 1302, whereupon the user may supply additional inputs or terminate the session (e.g., log off).

OS 1310 can execute directly on the bare hardware 1320 (e.g., processor(s) 1204) of device 1200. Alternatively, a hypervisor or virtual machine monitor (VMM) 1330 may be interposed between the bare hardware 1320 and the OS 1310. In this configuration, VMM 1330 acts as a software "cushion" or virtualization layer between the OS 1310 and the bare hardware 1320 of the device 1200.

VMM 1330 instantiates and runs one or more virtual machine instances ("guest machines"). Each guest machine comprises a "guest" operating system, such as OS 1310, and one or more applications, such as application(s) 1302, designed to execute on the guest operating system. The VMM 1330 presents the guest operating systems with a virtual operating platform and manages the execution of the guest operating systems.

In some instances, the VMM 1330 may allow a guest operating system to run as if it is running on the bare hardware 1320 of device 1200 directly. In these instances, the same version of the guest operating system configured to execute on the bare hardware 1320 directly may also execute on VMM 1330 without modification or reconfiguration. In other words, VMM 1330 may provide full hardware and CPU virtualization to a guest operating system in some instances.

In other instances, a guest operating system may be specially designed or configured to execute on VMM 1330 for efficiency. In these instances, the guest operating system is "aware" that it executes on a virtual machine monitor. In other words, VMM 1330 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

In the foregoing specification, the example embodiment(s) of the present Application have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
at one or more computing devices comprising one or more processors and storage media storing one or more computer programs executed by the one or more processors to perform the method, performing the operations of:
receiving an indication that a particular search template is to be used for a search of a body of data represented by an object-centric data model, wherein the particular search template translates user intent into search queries and the object-centric data model defines data objects and properties of the data objects comprising hierarchical object types and property types based on an ontology independent of any data storage model;
wherein the particular search template specifies one or more hierarchical object types defined in the object-centric data model that are within a scope of the search, wherein the hierarchical object types share disjunctive searches on a same hierarchical level;
wherein the particular search template specifies at least one search field related to at least one corresponding hierarchical object type of the one or more hierarchical object types, wherein the search field imposes a property restriction on the search, the property restriction being dependent on the one or more hierarchical object types that are specified;
based on the particular search template, generating a user interface that includes the at least one search field, wherein the search is scoped based on the at least one corresponding hierarchical object type for the at least one search field and equivalent to searching each sub-type of the hierarchical object type;
retrieving one or more first data objects from the body of data based on causing the search to be executed against the body of data, wherein the one or more first data objects are within the scope of the search; and providing one or more second data objects that are outside the scope of the search based on one or more relationships, defined in the object-centric data model, between the one or more first data objects and the one or more second data objects.

2. The method of claim 1, wherein each search field of the at least one search field corresponds to a respective property type, defined in the object-centric data model, that is associated with the one or more hierarchical object types.

3. The method of claim 1, wherein the at least one search field includes one or more search fields that accept input from an interactive map.

4. The method of claim 1, wherein the particular search template restricts the search to a user-specified geographical region.

5. The method of claim 1, wherein a particular property type associated with the one or more hierarchical object types corresponds to two or more disjunctive search fields in the at least one search field.

6. The method of claim 1, wherein the one or more hierarchical object types include two or more disjunctive object types.

7. The method of claim 1, wherein the particular search template is one of a plurality of search templates.

8. The method of claim 1, wherein the particular search template specifies the scope of the search.

9. The method of claim 1, further comprising:
subsequent to generating the user interface, providing the user interface to a user.

10. A system, comprising:
storage media;
one or more processors; and
one or more programs stored in the storage media and configured for execution by the one or more processors, the one or more programs comprising instructions for:
receiving an indication that a particular search template is to be used for a search of a body of data represented by an object-centric data model, wherein the particular search template translates user intent into search queries and the object-centric data model defines data objects and properties of the data objects comprising hierarchical object types and property types based on an ontology independent of any data storage model;
wherein the particular search template specifies one or more hierarchical object types defined in the object-centric data model that are within a scope of the search wherein the hierarchical object types share disjunctive searches on a same hierarchical level;
wherein the particular search template specifies at least one search field related to at least one corresponding hierarchical object type of the one or more hierarchical object types, wherein the search field imposes a property restriction on the search, the property restriction being dependent on the one or more hierarchical object types that are specified;
based on the particular search template, generating a user interface that includes the at least one search field, wherein the search is scoped based on the at least one corresponding hierarchical object type for the at least one search field and equivalent to searching each sub-type of the hierarchical object type;
retrieving one or more first data objects from the body of data based on causing the search to be executed against the body of data, wherein the one or more first data objects are within the scope of the search; and
providing one or more second data objects that are outside the scope of the search based on one or more relationships, defined in the object-centric data model, between the one or more first data objects and the one or more second data objects.

11. The system of claim 10, wherein each search field of the at least one search field corresponds to a respective property type, defined in the object-centric data model, that is associated with the one or more hierarchical object types.

12. The system of claim 10, wherein the at least one search field includes one or more search fields that accept input from an interactive map.

13. The system of claim 10, wherein the particular search template restricts the search to a user-specified geographical region.

14. The system of claim 10, wherein a particular property type associated with the one or more hierarchical object types corresponds to two or more disjunctive search fields in the at least one search field.

15. The system of claim 10, wherein the one or more hierarchical object types include two or more disjunctive object sub-types.

16. The system of claim 10, wherein the particular search template is one of a plurality of search templates.

17. The system of claim 10, wherein the particular search template specifies the scope of the search.

18. The system of claim 10, wherein the one or more programs further comprise instructions for:
subsequent to generating the user interface, providing the user interface to a user.

* * * * *